(12) United States Patent
Sano

(10) Patent No.: US 8,747,521 B2
(45) Date of Patent: Jun. 10, 2014

(54) GAS SEPARATION MEMBRANE AND METHOD FOR PRODUCING THE SAME, AND GAS SEPARATING METHOD, MODULE AND SEPARATION APPARATUS USING THE SAME

(75) Inventor: Satoshi Sano, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/577,872

(22) PCT Filed: Feb. 10, 2011

(86) PCT No.: PCT/JP2011/052947
§ 371 (c)(1),
(2), (4) Date: Aug. 8, 2012

(87) PCT Pub. No.: WO2011/099587
PCT Pub. Date: Aug. 18, 2011

(65) Prior Publication Data
US 2012/0297976 A1  Nov. 29, 2012

(30) Foreign Application Priority Data
Feb. 10, 2010 (JP) .................. 2010-028268

(51) Int. Cl.
*B01D 53/22* (2006.01)
(52) U.S. Cl.
USPC .................. 95/47; 95/45; 95/49; 96/7; 96/11; 96/12
(58) Field of Classification Search
USPC .............................. 95/45, 47, 49; 96/7, 11, 12
See application file for complete search history.

(56) References Cited

U.S. PATENT DOCUMENTS

| | | | | | |
|---|---|---|---|---|---|
| 4,670,146 | A | * | 6/1987 | Inoue et al. | 210/490 |
| 5,009,678 | A | * | 4/1991 | Bikson et al. | 95/47 |
| 5,061,301 | A | * | 10/1991 | Kim et al. | 96/12 |
| 5,286,280 | A | * | 2/1994 | Chiou | 95/45 |
| 5,445,669 | A | | 8/1995 | Nakabayashi et al. | |
| 5,700,375 | A | * | 12/1997 | Hagen et al. | 210/651 |
| 5,725,769 | A | * | 3/1998 | Miller et al. | 210/500.39 |

(Continued)

FOREIGN PATENT DOCUMENTS

| | | | |
|---|---|---|---|
| JP | 7-112122 A | 5/1995 |
| JP | 7-275672 A | 10/1995 |

(Continued)

OTHER PUBLICATIONS

International Preliminary Report on Patentability issued in PCT/JP2011/052947 on Sep. 18, 2012.

(Continued)

*Primary Examiner* — Jason M Greene
*Assistant Examiner* — Anthony Shumate
(74) *Attorney, Agent, or Firm* — Birch, Stewart, Kolasch & Birch, LLP

(57) ABSTRACT

Provided is a gas separation membrane having superior gas permeability, separation selectivity and mechanical properties. A gas separation membrane to separate at least one acid gas from a mix gas, comprising in this order: a first layer that is porous; a second layer that is a separation-active layer containing a compound having a molecular weight of 150,000 or less and capable of interacting with the acid gas; and a third layer having high gas permeability.

15 Claims, 1 Drawing Sheet

(56) References Cited

U.S. PATENT DOCUMENTS

| | | | |
|---|---|---|---|
| 6,726,744 B2* | 4/2004 | Kulprathipanja et al. | 95/45 |
| 7,572,321 B2* | 8/2009 | Yamakawa et al. | 96/11 |
| 7,790,292 B2* | 9/2010 | Colborn et al. | 428/447 |
| 8,129,450 B2* | 3/2012 | Wood et al. | 524/48 |
| 2007/0129492 A1* | 6/2007 | Colborn et al. | 525/100 |
| 2007/0264520 A1* | 11/2007 | Wood et al. | 428/606 |
| 2009/0156875 A1 | 6/2009 | Tomioka et al. | |
| 2010/0003591 A1* | 1/2010 | Takita et al. | 429/145 |
| 2010/0227996 A1 | 9/2010 | Asai et al. | |
| 2010/0295511 A1* | 11/2010 | Kikuchi et al. | 320/128 |
| 2011/0036237 A1 | 2/2011 | Okada et al. | |
| 2013/0014642 A1* | 1/2013 | Sano | 95/45 |
| 2013/0146538 A1* | 6/2013 | Liu et al. | 210/650 |

FOREIGN PATENT DOCUMENTS

| | | |
|---|---|---|
| JP | 2000-229219 A | 8/2000 |
| JP | 2001-120940 A | 5/2001 |
| JP | 2006-297335 A | 11/2006 |
| JP | 2007-297605 A | 11/2007 |
| JP | 2008-036463 A | 2/2008 |
| JP | 2008-36463 A | 2/2008 |
| JP | 2008-036464 | 2/2008 |
| JP | 2008-63464 A | 3/2008 |
| JP | 2009-185118 A | 6/2009 |
| JP | 2009-185118 A | 8/2009 |
| JP | 2009-195900 A | 9/2009 |
| WO | WO 2009/093666 A1 | 7/2009 |

OTHER PUBLICATIONS

International Search Report for PCT/JP2011/052947 dated Mar. 15, 2011.

Written Opinion of the International Searching Authority for PCT/JP2011/052947 dated Mar. 15, 2011.

Japanese Office Action issued in Japanese Patent Application No. 2011-027908 on Dec. 24, 2013, 3 pages.

* cited by examiner

GAS SEPARATION MEMBRANE AND METHOD FOR PRODUCING THE SAME, AND GAS SEPARATING METHOD, MODULE AND SEPARATION APPARATUS USING THE SAME

TECHNICAL FIELD

The present invention relates to a novel gas separation membrane capable of efficiently separating a specific acid gas from a gas mixture containing gas such as hydrogen, helium, carbon monoxide, carbon dioxide, hydrogen sulfide, oxygen, nitrogen, ammonia, sulfur oxide, nitrogen oxide, hydrocarbon such as methane and ethane, unsaturated hydrocarbon such as propylene, and a perfluoro compound such as tetrafluoroethane, particularly, a gas separation membrane which selectively separates carbon dioxide from a gas mixture containing carbon dioxide, a method for producing the same, a gas separating method, a module and a separation apparatus using the same.

BACKGROUND ART

Conventionally, it was known that gas component can be separated through membranes made of polymer materials, since the polymer materials have an inherent gas permeability thereof. Recently, regarding environmental problem of global warming, such a membrane is suggested as a means for separating and recovering carbon dioxide from bulk carbon dioxide sources such as thermal power stations or cement plants, blast furnaces in steel mill and the like, while reducing energy. Meanwhile, natural gas or bio gas (gases generated by fermentation and anaerobic digestion of excreta of organisms, organic fertilizers, biodegradable substances, polluted water, garbages, energy crops, and the like) is mainly a mixed gas of methane and carbon dioxide, and hydrogen is generally prepared via modification of natural gas with water vapor and water gas shift. In this process, a gas mixture containing about 40% of carbon dioxide and about 60% of hydrogen is obtained. When a method is capable of selectively permeating or removing carbon dioxide as impurity with a low concentration, the method may be considered to be economically excellent as a separation and purification method. Therefore, membrane separation methods have been researched as means for removing impurities (For example, see Patent document 1 and Patent document 2).

However, permeability (permeability coefficient) of gas in a polymer membrane is expressed by a product of gas solubility coefficient (solubility) and gas diffusion coefficient (diffusion property) in the polymer membrane (See, for example non-patent Document 1). For this reason, in order to selectively improve permeability (permeability coefficient) of carbon dioxide with respect to a separated gas, solubility coefficient (solubility) and/or diffusion coefficient (diffusion property) of carbon dioxide in polymer membranes are selectively improved. General polymer membranes are however known to have a problem of trade-off relation in which as selectivity increases, permeability decreases. In an attempt to overcome this trade-off of polymer membrane, a separation-active membrane, called "liquid membrane" or "facilitated transport membrane" is suggested.

The facilitated transport membrane is a membrane in which a substance (carrier) that reversibly and selectively reacts with only a specific permeation material is incorporated, which is also called "carrier transport membrane". The permeation material can be permeated by a dissolution and diffusion mechanism through a membrane matrix as well as a formation of a reaction product with the carrier, and thus it is obtained a high permeation selectivity as compared to a co-existing gas other than permeation materials capable of being permeated by the dissolution and diffusion mechanism (see, for example, Non-patent Document 2). For example, in carbon dioxide/hydrogen separation, conventional polymer membranes have separation selectivity of about several tens (see, for example Non-patent Document 3). However, it is disclosed an example of the facilitated transport membranes having separation selectivity of 100 or higher (see, for example, Patent Documents 3 to 6).

RELATED ART

Patent Document

Patent Document 1: JP-A-2007-297605
Patent Document 2: JP-A-2006-297335
Patent Document 3: JP-A-2008-36463
Patent Document 4: JP-A-2008-36464
Patent Document 5: JP-A-2009-195900
Patent Document 6: JP-A-2009-185118

Non-Patent Document

[Non-patent Document 1] "High technologies of gas separation membrane•permeation membrane•barrier membrane", pp 52-59, edited by Nagai Kazukiyo and issued by CMC.
[Non-patent Document 2] Membrane, 2004, 29(4) 194-201.
[Non-patent Document 3] Science, 2006, 311, 639-642.

DISCLOSURE OF INVENTION

Problems to be Solved by the Invention

As described above, in natural gas, bio gas and hydrogen preparation plants, separation of acid gas, in particular, carbon dioxide, as an impurity is required.

Patent Documents 3 to 5 use hydrophilic micro-filtration membranes (microfilters) as support membranes and fill and form gel membranes made of cross-linked polyvinyl alcohol in holes, thus satisfying all of mechanical strength, superior gas permeability and separation selectivity. However, as a result of research of the present inventors, since the polyvinyl alcohol is used as a material, membranes are hard in a dried state, there are the cases that they are brittle in impact or bending and are often cracked or chipped. Also, when a gel membrane material is not sufficiently filled in holes of a porous support membrane, it can be seen that a membrane having pinholes is formed, attention is further required for formation of membrane, for example, the membrane often does not exhibit desired separation selectivity and further improvement is thus necessary. The gas separation membrane is a membrane that separates angstrom-order molecules, and generation of pinholes is a factor greatly affecting performance.

In order to inhibit generation of pinholes, formation of a pin hole-inhibiting layer or protective layer as a dense layer on the superficial layer was not performed. For example, when angstrom- to nanometer-order molecules are separated using a membrane such as gas separation membrane or reverse osmosis membrane, active formation of a dense layer on the superficial layer of the separation-active layer was not almost researched in the art. The reason for this was that, obviously, a total membrane thickness increases, and permeability of target molecules is significantly deteriorated.

However, as a research result, the present inventors found out that, although a casting solution of the protective layer is casted in order to further coat the superficial layer of the separation-active layer, the separation-active layer is densely formed thereunder, the casting solution is not excessively permeated into the separation-active layer provided thereunder and a thin film could be thus formed. Also, it was found out that a thin membrane in which deterioration of permeability is inhibited to the lowest limit range and permeability sufficient for the gas separation membrane is provided can be formed by adjusting concentration and viscosity of the casting solution coated on the surface and as a result, effects of inhibiting generation of pinholes and greatly improving membrane-formation success rate can be obtained.

Furthermore, though it was not expected at first, it was found out that, since the casting solution for surface coating is partially permeated into this separation-active layer and the ingredient exhibited an effect as a plasticizer, for example, although a separation-active layer is a separation-active membrane made of a polyvinyl alcohol cross-linkage structure that is hard at room temperature, bendability is imparted to the separation-active layer and, consequently, the separation-active layer exhibits superior mechanical properties such as tensile modulus or fracture elongation as well as improved pressure resistance.

The present invention solves the aforementioned problems and furthermore provides a gas separation membrane that exhibits superior gas permeability, separation selectivity and mechanical properties. Further, it is object of the present invention to provide a method for producing a gas separation membrane, a method for separating a gas mixture, and a module and a separation apparatus using the gas separation membrane.

Means for Solving the Problems

That is, the present invention is accomplished by the following means.
(1) A gas separation membrane to separate at least one acid gas from a mix gas, comprising in this order:
 a first layer that is porous;
 a second layer that is a separation-active layer containing a compound having a molecular weight of 150,000 or less and capable of interacting with the acid gas; and
 a third layer having high gas permeability.
(2) The gas separation membrane as described in (1),
 wherein the third layer comprises a cross-linked polymer.
(3) The gas separation membrane as described in (1) or (2),
 wherein the second layer comprises at least one hydrophilic cross-linked polymer.
(4) The gas separation membrane as described in (3),
 wherein the hydrophilic cross-linked polymer of the second layer comprises at least one repeating unit selected from polyethylene glycol, polypropylene glycol, polyvinyl alcohol, polyvinyl acetate, polyvinylpyrrolidone, polyethyleneimine and polyallylamine.
(5) The gas separation membrane as described in any one of (2) to (4),
 wherein the cross-linked polymer of the third layer comprises at least one repeating unit selected from polyethylene glycol, polypropylene glycol, polysiloxane, and polyolefin.
(6) The gas separation membrane as described in any one of (3) to (5),
 wherein the hydrophilic cross-linked polymer of the second layer is a polymer comprising a repeating unit represented by the following Formula (I):

[Chem. 1]

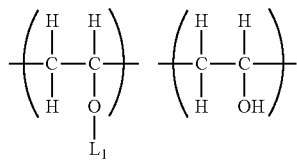

Formula (I)

(wherein in Formula (I), $L_1$ represents an x-valent linking group, and x is an integer of 2 or more.)
(7) The gas separation membrane as described in any one of (2) to (6),
 wherein the cross-linked polymer of the third layer comprises a repeating unit represented by the following Formula (II):

[Chem. 2]

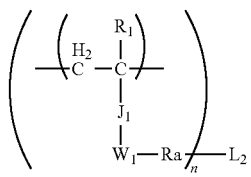

Formula (II)

(wherein in Formula (II), $R_1$ each independently represents a hydrogen atom or a substituent, $L_2$ represents an n-valent linking group, n represents a positive integer of 2 or more, $J_1$ represents —CO—, —COO—, —CONR$_2$—, —OCO—, a methylene group, a phenylene group, or a —C$_6$H$_4$CO— group, $R_2$ represents a hydrogen atom, an alkyl group, an aryl group, or an aralkyl group, $W_1$ represents a single bond or a bivalent linking group, Ra represents an alkylene glycol residue or a propylene glycol residue, and each of a plurality of $R_1$, $J_1$, $W_1$, $R_2$ and Ra may be the same or different.)
(8) The gas separation membrane as described in (7),
 wherein the cross-linked polymer of the third layer is a polymer comprising at least one repeating unit represented by the following Formula (III) and at least one repeating unit represented by Formula (II) above:

[Chem. 3]

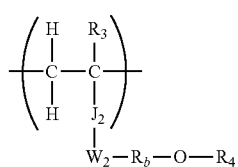

Formula (III)

(wherein in Formula (III), $R_3$ represents a hydrogen atom or a substituent, $J_2$ represents —CO—, —COO—, —CONR$_2$—, —OCO—, a methylene group, a phenylene group, or a —C$_6$H$_4$CO— group, $R_2$ represents a hydrogen atom, an alkyl group, an aryl group, or an aralkyl group, $W_2$ represents a single bond or a bivalent linking group, $R_b$ represents an alkylene glycol residue or a propylene glycol residue, $R_4$ represents a hydrogen atom, an alkyl group, or an aryl group, and each of a plurality of $J_2$, $W_2$, $R_2$, $R_3$, $R_4$, and $R_b$ may be the same or different.)

(9) The gas separation membrane as described in (5),
wherein the cross-linked polymer of the third layer is a polymer comprising, in a main chain thereof, at least one repeating unit selected from the following Formula (IV), the following Formula (V), the following Formula (VI) and the following Formula (VII):

[Chem. 4]

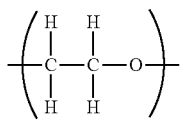
Formula (IV)

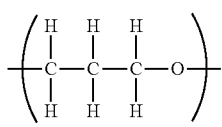
Formula (V)

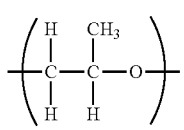
Formula (VI)

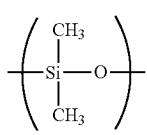
Formula (VII)

(10) The gas separation membrane as described in any one of (1) to (9),
wherein the compound having a molecular weight of 150,000 or less and being capable of interacting with an acid gas is at least one acid gas carrier selected from hydroxide of alkali metal, alkoxide of alkali metal, alkali metal carbonate, alkali metal bicarbonate, alkali metal phosphate, hydroxide of alkaline earth metal, alkoxide of alkaline earth metal, alkaline earth metal carbonate, alkaline earth metal bicarbonate, alkali metal phosphate, organic amine, ion liquids and metal complexes.
(11) The gas separation membrane as described in any one of (1) to (10),
wherein the gas separation membrane has a tensile modulus of 500 MPa or more.
(12) The gas separation membrane as described in any one of (1) to (11),
wherein the gas separation membrane has a tensile strength of 15 N/mm² or more and a fracture elongation of 10% or more.
(13) The gas separation membrane as described in any one of (1) to (12),
wherein the gas separation membrane has a heat resistance of 100° C. or more.
(14) A method for separating a gas mixture,
wherein the method separates at least one acid gas from a gas mixture comprising the at least one acid gas and at least one non-acid gas using the gas separation membrane as described in any one of (1) to (13),
wherein the acid gas is at least one selected from carbon dioxide, hydrogen sulfide, carbonyl sulfide, sulfur oxide (SOx), and nitrogen oxide (NOx), and
the non-acid gas is at least one selected from hydrogen, methane, nitrogen, and carbon monoxide.
(15) The method for separating a gas mixture as described in (14),
wherein the acid gas is carbon dioxide or hydrogen sulfide.
(16) The method for separating a gas mixture as described in (15),
wherein main ingredients of the gas mixture is carbon dioxide and methane, or carbon dioxide and hydrogen.
(17) A method for producing the gas separation membrane as described in any one of (2) to (13), comprising:
forming the third layer by irradiating an active radiation to a composition comprising a monomer of the cross-linked polymer, or heat-curing the composition comprising a monomer of the cross-linked polymer.
(18) The method for producing the gas separation membrane as described in (17),
wherein the composition comprising a monomer of the cross-linked polymer is a carrier solution having a solid concentration of 10 to 99% by mass and a viscosity of 50 to 5000 mPa·s,
wherein the gas separation membrane is formed by casting the carrier solution on the second layer and curing the carrier solution using active radiation or heating.
(19) A gas separation membrane module comprising:
the gas separation membrane as described in any one of (1) to (13).
(20) A gas separation apparatus comprising:
at least one of the gas separation membrane module as described in (19).

Advantage of the Invention

The present invention can provide an excellent gas separation membrane that exhibits superior gas separation selectivity such as $CO_2/H_2$ separation selectivity and superior mechanical strength due to plasticity to the extent that endures a bending test, and has little pinholes. According to the gas separation membrane of the present invention, it is possible to provide a superior gas separation method, a gas separation membrane module, and a gas separation apparatus including the gas separation membrane module.

EMBODIMENTS FOR CARRYING OUT THE INVENTION

Figure 1:
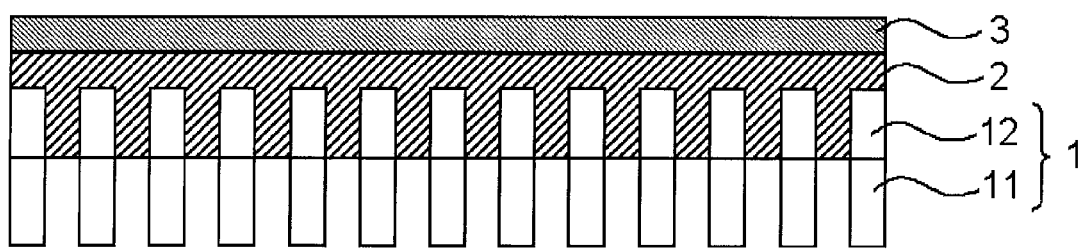
FIG. 1 is a view schematically illustrating a gas separation membrane according to one embodiment of the present invention.

Hereinafter, the present invention will be described in detail and should not be construed as limiting the scope of the present invention.
The gas separation membrane of the present invention is a gas separation membrane to separate at least one acid gas from a mix gas and has a laminate structure including a first layer that is porous, a second layer that is a separation-active layer containing a compound having a molecular weight of 150,000 or less and capable of interacting with the acid gas and a third layer having high gas permeability in this order.
[First Layer (Porous Layer)]
The first layer which is porous of the present invention is not particularly limited so long as it can satisfy the purpose for imparting mechanical strength and high gas permeability, a porous membrane made of any of organic and inorganic materials may be used, but a porous membrane made of an organic polymer is preferred.

The thickness of the porous membrane is preferably 1 to 3,000 μm, more preferably 5 to 500 μm, even more preferably 5 to 150 μm.

The fine pore structure of the porous membrane commonly has an average pore hole diameter of 10 μm or less, preferably 0.01 μm to 5 μm, more preferably 0.1 μm to 0.5 μm, and preferably has a void ratio of 20 to 90%, more preferably 30 to 80%. In addition, regarding gas permeability, it is preferred that the fine pore structure has a carbon dioxide permeation speed of $7.5 \times 10^{-11}$ m$^3$/m$^2$s·Pa or more.

Examples of the material for porous membrane include conventionally well-known polymers, including polyolefin-based resins such as polyethylene and polypropylene, fluorine-containing resins such as polytetrafluoroethylene, polyvinyl fluoride, polyvinylidene fluoride, and various resins such as polystyrene, cellulose acetate, polyurethane, polyacrylonitrile, polysulfone, polyethersulfone, polyimide and polyaramide.

The shape of porous membrane may be any of plate, spiral, tubular and hollow fibers.

The first layer may be formed by laminating a hydrophilic porous membrane and a hydrophobic porous membrane. In this case, regarding each porous membrane, thickness, find pore structure, void ratio, gas permeability, material, shape and the like are preferably within the ranges described above. The thickness of the laminate is preferably 2 to 6,000 μm, more preferably 10 to 1,000 μm, even more preferably 10 to 300 μm. In addition, when the hydrophilic porous membrane and the hydrophobic porous membrane are laminated, the second layer is preferably formed on the hydrophilic porous membrane. By applying the composition for forming a second layer (casting solution) onto the hydrophilic porous membrane, occurrence of scattering or the like in the hole of porous membrane is inhibited, the casting solution is densely filled and then gelled and, as a result, a dense gas separation membrane with inhibited generation of pinholes can be obtained. By mounting a hydrophobic porous membrane on the lower layer (opposite side to the second layer) of the hydrophilic porous membrane, permeation of the casting solution into the lowermost part caused by the effect of scattering or the like can be inhibited, and furthermore, elution of acid gas carriers contained in the gas separation membrane can be inhibited.

[Second Layer (Separation-Active Layer)]

In the present invention, the second layer is a separation-active layer containing a compound having a molecular weight of 150,000 or less and capable of interacting with an acid gas.

That the compound interacts with the acid gas means an action or response derived from properties of a target acid gas and examples thereof include dipole interaction, acid-base interaction, coulomb interaction, size interaction and the like. It means that this interaction can improve adsorbability, compatibility or reactivity with the target acid gas, further facilitate absorption, permeation and diffusion of acid gas into the membrane, and an effect that the difference in permeability between an acid gas and a non-acid gas is increased can be attained.

Examples of the acid gas include carbon dioxide, hydrogen sulfide, carbonyl sulfide, sulfur oxide (SOx), nitrogen oxide (NOx) and hydrogen halide such as hydrogen chloride and is preferably at least one selected from carbon dioxide, hydrogen sulfide, carbonyl sulfide, sulfur oxide (SOx), and nitrogen oxide (NOx), more preferably carbon dioxide, hydrogen sulfide or sulfur oxide (SOx), even more preferably carbon dioxide.

<Compound (Carrier) Having a Molecular Weight of 150,000 or Less and Capable of Interacting with an Acid Gas>

The compound having a molecular weight of 150,000 or less and capable of interacting with an acid gas is preferably an acid gas carrier. The membrane having this carrier is generally referred to as a facilitated transport membrane, which is described in "Material Science of Membranes for Gas and Vapor Separation" Chapter 17 (pp 411-435) (edited by Yu. Yampolskii, I. Pinnau, B. D. Freeman) in detail.

The acid gas carrier is not particularly limited, but is preferably a compound having a molecular weight of 150,000 or less and having an affinity to an acid gas, and examples thereof include hydroxide of alkali metal (for example, sodium hydroxide, potassium hydroxide, rubidium hydroxide and cesium hydroxide), alkoxide of alkali metal (for example, sodium methoxide, sodium ethoxide, tert-butoxy sodium and tert-butoxy potassium), alkali metal carbonate (for example, sodium carbonate, potassium carbonate, rubidium carbonate and cesium carbonate), alkali metal bicarbonate (for example, sodium hydrogen carbonate and potassium hydrogen carbonate), alkali metal phosphate (sodium phosphate and potassium phosphate), hydroxide of alkaline earth metal, alkoxide of alkaline earth metal, alkaline earth metal carbonate, alkaline earth metal bicarbonate, alkali metal phosphate, organic amines (for example, alkanolamine, specifically, monoethanolamine, diethanolamine, triethanolamine, ethylmonoethanolamine, n-butylmonoethanolamine, dimethylethanolamine, ethyldiethanolamine, n-butylethanolamine, di-n-butylethanolamine, triisopropanolamine, PAMAM dendrimers such as dendrimers modified with a hydroxyl group described in JP-A-2007-54710, polyallylamine or polyethyleneimine and the like), tetraammonium hydroxide (for example, tetramethylammonium hydroxide, benzyltrimethylammonium hydroxide, choline hydroxide and tetrabutylammonium hydroxide), guanidines (for example, guanidine and tetramethylguanidine), heterocyclic bases (for example, 1,8-diazabicyclo[5.4.0]-7-undecene and 1,8-diazabicyclo[4,3,0]-7-nonene), amino acids (for example, glycine, dimethylamine glycine, and 2,3-diaminopropionic acid), metal complexes (for example, rhodium metal complexes described in JP-A-6-142466 or molybdenum complexes described in JP-A-6-142467), ion liquids (for example, chemical substances selected from compounds comprising a combination of the following cations and anions:

(i) cations: imidazolium having the following substituent at a 1,3 position in which the substituent is an alkyl group, a hydroxyalkyl group, an ether group, an allyl group, an aminoalkyl group or an aryl group; pyrrolidinium cations having an alkyl group, a hydroxyalkyl group, an ether group, an allyl group, an aminoalkyl group or an aryl group as a substituent; pyridinium cations having an alkyl group or an aryl group as a substituent; phosphonium cations having an alkyl group, a hydroxyalkyl group, an ether group, an allyl group, an aminoalkyl group or an aryl group as a substituent; or tetraammonium cations having an alkyl group, a hydroxyalkyl group, an ether group, an allyl group, an aminoalkyl group or an aryl group as a substituent.

(ii) anions: chloride ions, bromide ions, boron tetrafluoride ions, nitrate ions, bis(trifluoromethanesulfonyl)imide ions, bis(perfluorobutylmethanesulfonyl)imide ions, hexafluorophosphate ions, trifluoromethanesulfonate ions or the like. In addition, specific examples of useful ion liquids include 1-allyl-3-ethylimidazolium bromide, 1-ethyl-3-methylimidazolium bromide, 1-(2-hydroxyethyl)-3-methylimidazolium bromide, 1-(2-methoxyethyl)-3-methylimidazolium bromide, 1-octyl-3-methylimidazolium chloride, N,N-diethyl-N-methyl-N-(2-methoxyethyl)ammonium tetrafluoroborate, ethylmethylimidazolium bis(trifluoromethanesulfonyl) imide, ethylmethylimidazolium bistrifluoromethane sulfonate, ethylmethylimidazolium dicyanamide, and trihexyltetradecylphosphonium chloride and the like, and ion liquids are preferably imidazolium salts, tetraammonium salts, pyridinium salts and phosphonium salts, more preferably imidazolium salts, pyridinium salts and phosphonium salts, more preferably pyridinium salts or phosphonium salts.

In addition, examples of the additive, other than ion liquids, include additives well-known in the art, such as chemical substances selected from glycerin, polyglycerin, polyethylene glycol, polypropylene glycol, polyethylene oxide, polyethylene imine, polyallylamine and polyacrylic acid). In addition, in the case of the above-described carbonate or bicarbonate of alkali metal, it may be used in together with a multidentate ligand that forms a complex with an alkali metal ion, or sodium arsenite, carbonic anhydrase, boric acid as an auxiliary additive ingredient.

Examples of useful multidentate ligands that form a complex with an alkali metal ion include multidentate ligands conventionally well-known in the art, for example: cyclic polyethers such as 12-crown-4, 15-crown-5, 18-crown-6, benzo-12-crown-4, benzo-15-crown-5, benzo-18-crown-6, dibenzo-12-crown-4, dibenzo-15-crown-5, dibenzo-18-crown-6, dicyclohexyl-12-crown-4, dicyclohexyl-15-crown-5, dicyclohexyl-18-crown-6, n-octyl-12-crown-4, n-octyl-15-crown-5, n-octyl-18-crown-6; cyclic polyetheramine such as cryptand[2.1] and cryptand[2.2]; bicyclic polyetheramine such as cryptand[2.1.1] and cryptand[2.2.2], as well as porphyrin, phthalocyanine, polyethylene glycol, ethylenediaminetetraacetic acid and the like.

The acid gas carrier is not limited to those described above, any substance may be used as the acid gas carrier so long as it has an affinity to an acid gas and is water-soluble and may be selected from a variety of compounds such as alkali metal salts of organic acids.

In terms of low chemical stability and vapor pressure of acid gas carriers and low risk of losing from membranes, hydroxide of alkali metal, alkoxide of alkali metal, alkali metal carbonate, alkali metal bicarbonate, alkali metal phosphate, hydroxide of alkaline earth metal, alkoxide of alkaline earth metal, alkaline earth metal carbonate, alkaline earth metal bicarbonate, alkali metal phosphate, organic amines, ion liquids, and metal complexes that can exhibit long-term durability of separation performance are preferred. Organic amine, alkali metal carbonate, alkali metal bicarbonate and alkali metal phosphate are more preferred, and organic amine, alkali metal carbonate and alkali metal phosphate are even more preferred.

In addition, examples of acid gas carriers include water-soluble sulfite such as sodium sulfite or potassium sulfite known as a sulfur dioxide carrier, hemoglobin known as an oxygen or carbon monoxide carrier, a water-soluble copper compound that form copper complex ions, such as $Cu(NH_4)^{2+}$ and $Cu(Cl_2)^{2-}$, known as a carbon monoxide carrier, and the like. In addition, a mixture of these carriers may be also used.

The molecular weight of the acid gas carrier is preferably 50 to 150,000, more preferably 100 to 100,000, even more preferably 100 to 5,000, particularly preferably 100 to 3,000. It is preferable to have parts that interact with acid gas as much as possible in the molecule.

The content of the compound having a molecular weight of 150,000 or less and capable of interacting with an acid gas in the second layer is preferably 5 to 90% by mass, more preferably 10 to 80% by mass, particularly preferably 30 to 70% by mass, with respect to the total solid of the composition constituting the second layer.

<Hydrophilic Cross-Linked Polymer>

In the present invention, the second layer, that is a separation-active layer, preferably contains a cross-linked polymer in terms of mechanical strength and inhibition of plasticization of acid gas absorbed in the membrane, and contains at least one hydrophilic cross-linked polymer in terms of having sufficient water vapor permeability and water-retention property to a membrane in order to enable an acid gas carrier to sufficiently act.

The hydrophilic cross-linked polymer is not particularly limited, but is preferably at least one repeating unit selected from polyethylene glycol, polypropylene glycol, polyvinyl alcohol (PVA), polyvinyl acetate, polyvinylpyrrolidone, polyallylamine, and polyethyleneimine Of these repeating units, in terms of hydrophilicity and membrane-forming property, polyethylene glycol, polypropylene glycol, polyvinyl alcohol, polyethyleneimine, polyallylamine are preferred, polyethylene glycol, polypropylene glycol, polyvinyl alcohol, polyallylamine and polyethyleneimine are more preferred, and polyvinyl alcohol is particularly preferred.

The content of the above repeating unit in the cross-linked polymer of the second layer is preferably 5 to 95 mol %, more preferably 10 to 90 mol %, and particularly preferably 10 to 80 mol %, with respect to the total repeating unit constituting the cross-linked polymer. Within this range, membrane-forming property, gas permeability and mechanical strength are excellent.

Of the cross-linked polymer, the repeating unit may be used alone or in combination of two or more types. When the repeating unit is used in combination of two or more types, a combination of polyethylene glycol and polypropylene glycol, a combination of polyethylene glycol and polyallylamine, and a combination of polyvinyl alcohol and polyallylamine are preferred, and a combination of polyvinyl alcohol and polyallylamine is more preferred.

Since the cross-linked polymer of the second layer has a three-dimensional cross-linkage structure, a number average molecular weight thereof is not particularly limited. The weight average molecular weight of cross-linked polymer as a main chain or a side chain excluding the cross-linkage structure part is preferably 1,000 to 100,000, more preferably 1,000 to 50,000, more preferably 2,000 to 15,000, in terms of polystyrene based on a GPC method.

In the same manner as above, the dispersibility of the cross-linked polymer is not particularly limited, but the main chain or side chain is preferably 1 to 5, more preferably 1 to 3, even more preferably 1 to 2. Within this range, superior membrane-forming property and mechanical strength can be accomplished.

The content of the cross-linked polymer of the second layer is preferably 1 to 90% by mass, more preferably 1 to 80% by mass, even more preferably 5 to 70% by mass, based on the total solid of the composition constituting the second layer. The cross-linked polymer may be used alone or in combination of two or more types.

The cross-linked polymer of the second layer is more preferably a polymer comprising a repeating unit represented by the following Formula (I). The polymer comprising a repeating unit represented by the following Formula (I) is a polymer comprising cross-linked polyvinyl alcohol.

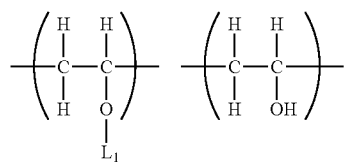
Formula (I)

(In Formula (I), $L_1$ represents an x-valent linking group and x represents an integer of 2 or more.)

Formula (I) will be described in detail.

In Formula (I), $L_1$ represents an x-valent linking group and specific examples thereof include linking groups including structural units represented by the following Formulae (L-1) to (L-35) and a combination thereof. The polymer comprising repeating units represented by Formula (I) has a cross-linkage structure in which repeating units of Formula (I) are combined to one another via $L_1$.

[Chem. 6]

 (L-1)

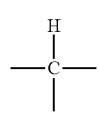 (L-2)

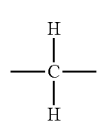 (L-3)

 (L-4)

 (L-5)

 (L-6)

 (L-7)

 (L-8)

 (L-9)

 (L-10)

 (L-11)

-continued

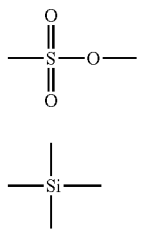 (L-12)

(L-13)

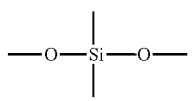

(L-14)

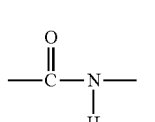

(L-15)

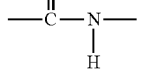

(L-16)

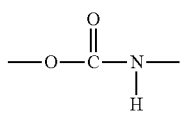

(L-17)

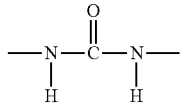

(L-18)

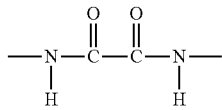

(L-19)

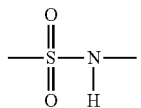

(L-20)

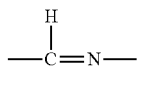

(L-21)

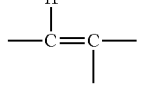

(L-22)

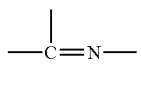

(L-23)

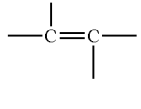

(L-24)

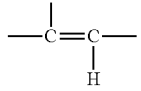

(L-25)

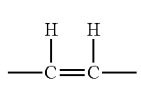

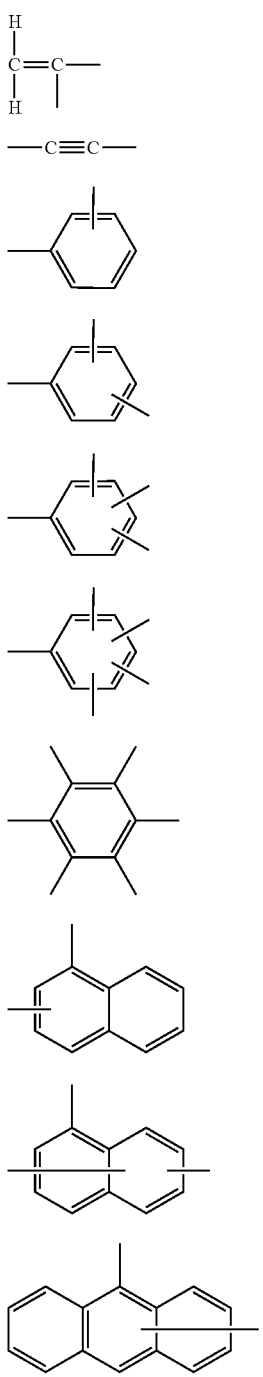

(L-26)

(L-27)

(L-28)

(L-29)

(L-30)

(L-31)

(L-32)

(L-33)

(L-34)

(L-35)

$L_1$ which is composed of a group selected from the above-mentioned (L-1) to (L-35) is preferably an alkylene group, an alkyleneoxy group or an arylene group, more preferably an alkylene group or an alkyleneoxy group, even more preferably a group having an ether bond in the molecule.

X represents a positive integer of 2 or more. Preferably, x is 2 to 6, more preferably 2 to 4.

Such a cross-linkage structure preferably uses a cross-linking agent such as formaldehyde or glutaraldehyde, multifunctional isocyanate, multifunctional epoxide, or multifunctional carbodiimide.

Among the repeating units of Formula (I), when mol % of the repeating unit represented by the following Formula (Ia) is a and mol % of the repeating unit represented by the following Formula (Ib) is b,

[Chem. 7]

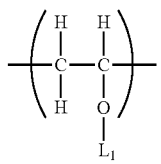

Formula (Ia)

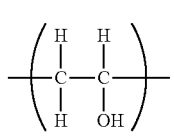

Formula (Ib)

In Formula (Ia), $L_1$ has the same meaning as that of Formula (I) and preferred range is also the same as that of Formula (I).

Preferably, a is 0.1% to 30%, b is 70% to 99.9%, more preferably, a is 0.1% to 20%, b is 80% to 99.9%, even more preferably, a is 0.5% to 20%, and b is 80% to 99.5%.

The polymer comprising a repeating unit represented by Formula (I) may comprise a repeating unit other than Formula (I) and examples of such a repeating unit include polyallylamine, polyethylene glycol, polypropylene glycol or the like.

In the polymer comprising a repeating unit represented by Formula (I), the content of the repeating unit represented by Formula (I) is preferably 30 to 99.9 mol %, more preferably 30 to 99 mol %, particularly preferably 30 to 95 mol %, with respect to the total repeating units constituting the polymer. Within this range, hydrophilicity and membrane-forming property are excellent.

[Third Layer (Layer Having High Gas Permeability)]

In the present invention, the third layer is a layer having high gas permeability. The gas permeability of the third layer is preferably higher than that of the second layer. The permeability coefficient of carbon dioxide of only the third layer is preferably $7.5 \times 10^{-18}$ $m^3 \cdot m/m^2 s \cdot Pa$ or more, more preferably $7.5 \times 10^{-17}$ $m^3 \cdot m/m^2 s \cdot Pa$ to $7.5 \times 10^{-12}$ $m^3 \cdot m/m^2 s \cdot Pa$, particularly preferably $7.5 \times 10^{-16}$ $m^3 \cdot m/m^2 s \cdot Pa$ to $7.5 \times 10^{-15}$ $m^3 \cdot m/m^2 s \cdot Pa$.

From a viewpoint of inhibiting deterioration in gas permeability, and imparting separation selectivity, membrane-forming property, bendability and mechanical strength, the third layer preferably contains a cross-linked polymer and the cross-linked polymer preferably has at least one repeating unit selected from polyethylene glycol, polypropylene glycol, polysiloxane, and polyolefin. Among the repeating units, in terms of gas permeability, membrane-forming property and bendability, polyethylene glycol, polypropylene glycol and polysiloxane are preferred, and polyethylene glycol or polysiloxane is more preferred.

The number average molecular weight of the repeating unit is preferably 300 to 1,000,000, more preferably 300 to 500,000, even more preferably 1,000 to 200,000 in terms of polystyrene based on a GPC method.

The content of the repeating units in the cross-linked polymer of the third layer is preferably 30 to 99.9 mol %, more preferably 30 to 99.8 mol %, and particularly preferably 30 to 95 mol %, with respect to the total repeating units constituting the cross-linked polymer.

The repeating unit may be used alone or in combination of two or more types for the cross-linked polymer.

Since the cross-linked polymer of the third layer has a three-dimensional cross-linkage structure, a molecular weight thereof is not particularly limited. The weight average molecular weight of cross-linked polymer as a main chain or a side chain excluding the cross-linkage structure part is preferably 1,000 to 100,000, more preferably 1,000 to 50,000, more preferably 2,000 to 15,000, in terms of polystyrene based on a GPC method.

In the same manner as above, the dispersibility of the cross-linked polymer is not particularly limited, the main chain or side chain is preferably 1 to 5, more preferably 1 to 3, even more preferably 1 to 2. Within this range, superior membrane-forming property can be accomplished.

The content of cross-linked polymer in the third layer is preferably 0.1 to 99% by mass, more preferably, 1 to 99% by mass, particularly preferably 5 to 98% by mass, based on the total solid of the composition constituting the third layer. This range is preferred from a viewpoint of imparting high gas permeability, membrane-forming property and bendability. The cross-linked polymer may be used alone or in combination of two or more types.

The glass transition temperature of the cross-linked polymer of the third layer is preferably 60° C. or less, more preferably 50° C. or less, even more preferably 40° C. or less from a viewpoint of imparting bendability to the gas separation membrane and improving mechanical strength. The lower limit is preferably −180° C. or higher, more preferably −160° C. or higher.

The composition (carrier solution) for forming the third layer preferably has a solid concentration of 10 to 99% by mass, more preferably 10 to 90% by mass. Any solvent may be used without particular limitation so long as it is capable of dissolving monomers of cross-linked polymers and examples of the solvent include one, or a mixture of two or more, selected from water-soluble solvents or organic solvents such as water, methanol, ethanol, isopropyl alcohol, chloroform, methylene chloride, acetone, dioxane, methyl acetate, cyclohexanone, methylethyl ketone, acetonitrile, tetrachloroethylene, tetrahydrofuran, dimethylsulfoxide, dimethylformamide, dimethylacetamide and N-methylpyrrolidone.

The third layer is preferably as thin as possible in order to inhibit deterioration in gas permeability. For this purpose, preferably, the viscosity of the carrier solution for forming the third layer is suitably adjusted. The carrier solution for forming the third layer preferably has a viscosity of 50 to 5,000 mPa·s, more preferably 100 to 1000 mPa·s, even more preferably 50 to 500 mPa·s. The third layer is preferably formed by casting the carrier solution for forming the third layer on the second layer and curing using active radiation or heating, and it is also preferable to cure it by combining both methods.

The cross-linked polymer of the third layer is preferably a polymer comprising a repeating unit represented by Formula (II).

[Chem. 8]

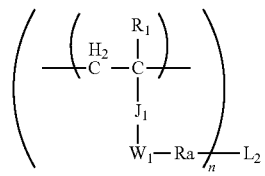

Formula (II)

(In Formula (II), each of $R_1$ independently represents a hydrogen atom or a substituent. $L_2$ represents an n-valent linking group. n represents a positive integer of 2 or more. $J_1$ represents —CO—, —COO—, —CONR$_2$—, —OCO—, a methylene group, a phenylene group, or a —C$_6$H$_4$CO— group. $R_2$ represents a hydrogen atom, an alkyl group, an aryl group, or an aralkyl group. $W_1$ represents a single bond or a bivalent linking group. Ra represents an alkylene glycol residue or a propylene glycol residue. Each of a plurality of $R_1$, $J_1$, $W_1$, $R_2$ and Ra may be the same or different.)

Formula (II) will be described.

In Formula (II), each of $R_1$ independently represents a hydrogen atom or a substituent. The substituent may be any one selected from the substituent group Z described below.

Substituent Group Z:

an alkyl group (preferably an alkyl group having 1 to 30 carbon atoms, more preferably an alkyl group having 1 to 20 carbon atoms, particularly preferably an alkyl group having 1 to 10 carbon atoms, and examples thereof include methyl, ethyl, iso-propyl, tert-butyl, n-octyl, n-decyl, n-hexadecyl), a cycloalkyl group (preferably a cycloalkyl group having 3 to 30 carbon atoms, more preferably a cycloalkyl group having 1 to 20 carbon atoms, particularly preferably a cycloalkyl group having a cycloalkyl group having 3 to 10 carbon atoms, and examples thereof include cyclopropyl, cyclopentyl, cyclohexyl and the like), an alkenyl group (preferably an alkenyl group having 2 to 30 carbon atoms, more preferably an alkenyl group having 2 to 20 carbon atoms, particularly preferably an alkenyl group having 2 to 10 carbon atoms, and examples thereof include vinyl, allyl, 2-butenyl, 3-pentenyl and the like), an alkynyl group (preferably an alkynyl group having 2 to 30 carbon atoms, more preferably an alkynyl group having 2 to 20 carbon atoms, particularly preferably an alkynyl group having 2 to 10 carbon atoms, and examples thereof include propargyl, 3-pentynyl and the like), an aryl group (preferably an aryl group having 6 to 30 carbon atoms, more preferably an aryl group having 6 to 20 carbon atoms, particularly preferably an aryl group having 6 to 12 carbon atoms, and examples thereof include phenyl, p-methylphenyl, naphthyl, anthranyl and the like), an amino group (preferably an amino group having 0 to 30 carbon atoms, more preferably an amino group having 0 to 20 carbon atoms, particularly preferably an amino group having 0 to 10 carbon atoms and examples thereof include amino, methylamino, dimethylamino, diethylamino, dibenzylamino, diphenylamino, ditolylamino and the like), an alkoxy group (preferably an alkoxy group having 1 to 30 carbon atoms, more preferably an alkoxy group having 1 to 20 carbon atoms, particularly preferably an alkoxy group having 1 to 10 carbon atoms, and examples thereof include methoxy, ethoxy, butoxy, 2-ethylhexyloxy and the like), an aryloxy group (preferably an aryloxy group having 6 to 30 carbon atoms, more preferably an aryloxy group having 6 to 20 carbon atoms, particularly preferably an aryloxy group having 6 to 12 carbon atoms, and examples thereof include phenyloxy, 1-naphthyloxy, 2-naphthyloxy and the like), a heterocyclic oxy group (preferably a heterocyclic oxy group having 1 to 30 carbon atoms, more preferably a heterocyclic oxy group having 1 to 20 carbon atoms, particularly preferably a heterocyclic oxy group having 1 to 12 carbon atoms, and examples thereof include pyridyloxy, pyrazyloxy, pyrimidyloxy, quinolyloxy and the like), an acyl group (preferably an acyl group having 1 to 30 carbon atoms, more preferably an acyl group having 1 to 20 carbon atoms, particularly preferably an acyl group having 1 to 12 carbon atoms, and examples thereof include acetyl, benzoyl, formyl, pivaloyl and the like), an alkoxycarbonyl group (preferably 2 to 30 carbon atoms, more preferably 2 to 20 carbon atoms, particularly preferably 2 to 12 carbon atoms, and examples thereof include methoxycarbonyl, ethoxycarbonyl and the like), an aryloxycarbonyl group (preferably 7 to 30 carbon atoms, more preferably 7 to 20 carbon atoms, particularly preferably 7 to 12 carbon atoms, and examples thereof include phenyloxycarbonyl), an acyloxy group (preferably 2 to 30 carbon atoms, more preferably 2 to 20 carbon atoms, particularly preferably 2 to 10 carbon atoms, and examples thereof include acetoxy, benzoyloxy and the like), an acylamino group (preferably 2 to 30 carbon atoms, more preferably 2 to 20 carbon atoms, particularly preferably 2 to 10 carbon atoms, and examples thereof include acetylamino, benzoylamino and the like), an alkoxycarbonylamino group (preferably an alkoxycarbonylamino group having 2 to 30 carbon atoms, more preferably an alkoxycarbonylamino group having 2 to 20 carbon atoms, particularly preferably an alkoxycarbonylamino group having 2 to 12 carbon atoms, and examples thereof include methoxycarbonylamino and the like), an aryloxycarbonylamino group (preferably an aryloxycarbonylamino group having 7 to 30 carbon atoms, more preferably an aryloxycarbonylamino group having 7 to 20 carbon atoms, particularly preferably an aryloxycarbonylamino group having 7 to 12 carbon atoms and examples thereof include phenyloxycarbonylamino and the like), a sulfonylamino group (preferably a sulfonylamino group having 1 to 30 carbon atoms, more preferably a sulfonylamino group having 1 to 20 carbon atoms, particularly preferably a sulfonylamino group having 1 to 12 carbon atoms, and examples thereof include methanesulfonylamino, benzenesulfonylamino and the like), a sulfamoyl group (preferably a sulfamoyl group having 0 to 30 carbon atoms, more preferably a sulfamoyl group having 0 to 20 carbon atoms, particularly preferably a sulfamoyl group having 0 to 12 carbon atoms, and examples thereof include sulfamoyl, methylsulfamoyl, dimethylsulfamoyl, phenylsulfamoyl and the like), a carbamoyl group (preferably a carbamoyl group having 1 to 30 carbon atoms, more preferably a carbamoyl group having 1 to 20 carbon atoms, particularly preferably a carbamoyl group having 1 to 12 carbon atoms, and examples thereof include carbamoyl, methylcarbamoyl, diethylcarbamoyl, phenylcarbamoyl and the like), an alkylthio group (preferably an alkylthio group having 1 to 30 carbon atoms, more preferably an alkylthio group having 1 to 20 carbon atoms, particularly preferably an alkylthio group having 1 to 12 carbon atoms and examples thereof include methylthio, ethylthio and the like), an arylthio group (preferably an arylthio group having 6 to 30 carbon atoms, more preferably an arylthio group having 6 to 20 carbon atoms, particularly preferably an arylthio group having 6 to 12 carbon atoms, and examples thereof include phenylthio and the like), a heterocyclic thio group (preferably a heterocyclic thio group having 1 to 30 carbon atoms, more preferably a heterocyclic thio group having 1 to 20 carbon atoms, particularly preferably a heterocyclic thio group having 1 to 12 carbon atoms, and examples thereof include pyridylthio, 2-benzimizolylthio, 2-benzoxazolylthio, 2-benzthiazolylthio and the like), a sulfonyl group (preferably a sulfonyl group having 1 to 30 carbon atoms, more preferably a sulfonyl group having 1 to 20 carbon atoms, particularly preferably a sulfonyl group having 1 to 12 carbon atoms, and examples thereof include mesyl, tosyl and the like), a sulfinyl group (preferably a sulfinyl group having 1 to 30 carbon atoms, more preferably a sulfinyl group having 1 to 20 carbon atoms, particularly preferably a sulfinyl group having 1 to 12 carbon atoms, and examples thereof include methanesulfinyl, benzenesulfinyl and the like), a ureido group (preferably a ureido group having 1 to 30 carbon atoms, more preferably a ureido group having 1 to 20 carbon atoms, particularly preferably a ureido group having 1 to 12 carbon atoms, and examples thereof include ureido, methylureido, phenylureido and the like), a phosphoric acid amide group (preferably a phosphoric acid amide group having 1 to 30 carbon atoms, more preferably a phosphoric acid amide group having 1 to 20 carbon atoms, particularly preferably a phosphoric acid amide group having 1 to 12 carbon atoms and examples thereof include diethylphosphoric acid amide, phenylphosphoric acid amide and the like), a hydroxyl group, a mercapto group, a halogen atom (for example, a fluorine atom, a chlorine atom, a bromine atom and an iodine atom, more preferably a fluorine atom), a cyano group, a sulfo group, a carboxyl group, an oxo group, a nitro group, a hydroxamic acid group, a sulfino group, a hydrazine group, an imino group, a heterocyclic group (preferably a heterocyclic group having 1 to 30 carbon atoms, more preferably a heterocyclic group having 1 to 12 carbon atoms, and examples of a hetero atom include a nitrogen atom, an oxygen atom and a sulfur atom, specifically examples of the heterocyclic group include imidazolyl, pyridyl, quinolyl, furyl, thienyl, piperidyl, morpholino, benzoxazolyl, benzimidazolyl, benzthiazolyl, carbazolyl, azepinyl groups and the like), a silyl group (preferably a silyl group having 3 to 40 carbon atoms, more preferably a silyl group having 3 to 30 carbon atoms, particularly preferably a silyl group having 3 to 24 carbon atoms and examples thereof include trimethylsilyl, triphenylsilyl and the like), a silyloxy group (preferably a silyloxy group having 3 to 40 carbon atoms, more preferably a silyloxy group having 3 to 30 carbon atoms, particularly preferably a silyloxy group having 3 to 24 carbon atoms and examples thereof include trimethylsilyloxy, triphenylsilyloxy and the like) and the like. These substituents may be further substituted by one or more substituent selected from the substituent group Z.

$R_1$ is preferably a hydrogen atom or an alkyl group, more preferably a hydrogen atom, a methyl group or an ethyl group, even more preferably a hydrogen atom.

$J_1$ represents —CO—, —COO—, —CONR$_2$—, —OCO—, a methylene group, a phenylene group, or —C$_6$H$_4$CO— group. $R_2$ represents a hydrogen atom, an alkyl group, an aryl group, or an aralkyl group, preferably a hydrogen atom, an alkyl group, and an aryl group, and preferred ranges thereof have the same meaning as preferred ranges of an alkyl group, an aryl group described in the substituent group Z. Of these, $J_1$ is preferably —CO—, —COO— or —OCO—, particularly preferably —COO—.

$W_1$ represents a single bond or a bivalent linking group. Examples of the bivalent linking group include a linear, branched or cyclic alkylene group (preferably an alkylene group having 1 to 30 carbon atoms, more preferably alkylene groups having 1 to 12 carbon atoms, more preferably alkylene group having 1 to 4 carbon atoms, examples thereof include methylene, ethylene, propylene, butylene, pentylene, hexylene, octylene, decylene and the like), an alkyleneoxy group (preferably an alkyleneoxy group having 1 to 30 carbon atoms, more preferably alkyleneoxy group having 1 to 12 carbon atoms, more preferably alkyleneoxy group having 1 to 4 carbon atoms, and examples thereof include methyleneoxy, ethyleneoxy, propyleneoxy, butyleneoxy, pentyleneoxy, hexyleneoxy, octyleneoxy, decyleneoxy and the like), an aralkylene group (preferably aralkylene groups having 7 to 30 carbon atoms, more preferably aralkylene groups having 7 to 13 carbon atoms, and examples thereof include benzylidene, cinnamylidene and the like), arylene groups (preferably arylene groups having 6 to 30 carbon atoms, more preferably arylene groups having 6 to 15 carbon atoms, and examples thereof include phenylene, cumenylene, mesitylene, tolylene, xylene and the like) and the like. These compounds may further have a substituent. In addition, a compound having an ether bond in the molecule is preferred.

$W_1$ is preferably a single bond, an alkylene group or an alkyleneoxy group, more preferably a single bond.

Ra represents an alkylene glycol residue or a propylene glycol residue. Ra is preferably an alkylene glycol residue. The molecular weight of the alkylene glycol residue or the propylene glycol residue is preferably 500 to 1,000,000, more preferably 500 to 500,000, even more preferably 1,000 to 300,000.

$L_2$ represents an n-valent linking group. n represents a positive integer of 2 or more. As shown in the description of $L_1$, examples of $L_2$ include linking groups comprising structural units represented by the above-mentioned (L-1) to (L-35) or a combination thereof and preferred examples of $L_2$ are the same as those of $L_1$.

Each of a plurality of $J_1$, $W_1$, $R_2$ and Ra may be the same or different.

n represents a positive integer of 2 or more, is preferably 2 to 100 and is more preferably 2 to 50.

The polymer comprising a repeating unit represented by Formula (II) is preferably formed by polymerizing a compound represented by the following Formula (IIa).

[Chem. 9]

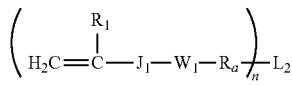

Formula (IIa)

(In Formula (IIa), each of $R_1$ independently represents a hydrogen atom or a substituent. $L_2$ represents an n-valent linking group. n represents a positive integer of 2 or more. $J_1$ represents —CO—, —COO—, —CONR$_2$—, —OCO—, a methylene group, a phenylene group or a —C$_6$H$_4$CO— group. $R_2$ represents a hydrogen atom, an alkyl group, an aryl group, or an aralkyl group. $W_1$ represents a single bond or represents a bivalent linking group. Ra represents an alkylene glycol residue or a propylene glycol residue. Each of a plurality of $J_1$, $W_1$, $R_2$ and Ra may be the same or different.)

In Formula (IIa), $R_1$, $J_1$, $W_1$, Ra, $L_2$ and n have the same meaning as $R_1$, $J_1$, $W_1$, Ra, $L_2$ and n of Formula (II), and the preferred ranges are also the same.

The content of the repeating unit represented by Formula (II) in the polymer comprising the repeating unit represented by Formula (II) is preferably 0.1 to 99 mol %, more preferably 0.5 to 90 mol %, particularly preferably 1 to 80 mol %, with respect to the total repeating units constituting the polymer.

The polymer comprising the repeating unit represented by Formula (II) is preferably a polymer comprising the repeating unit represented by Formula (II) and a repeating unit represented by the following Formula (III).

[Chem. 10]

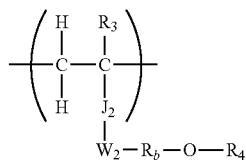

Formula (III)

(In Formula (III), $R_3$ represents a hydrogen atom or a substituent. $J_2$ represents —CO—, —COO—, —CONR$_2$—, —OCO—, a methylene group, a phenylene group, or a —C$_6$H$_4$CO— group. $R_2$ represents a hydrogen atom, an alkyl group, an aryl group, or an aralkyl group. $W_2$ represents a single bond or a bivalent linking group. $R_b$ represents an alkylene glycol residue or a propylene glycol residue, $R_4$ represents a hydrogen atom, an alkyl group, or an aryl group. Each of a plurality of $J_2$, $W_2$, $R_2$, $R_3$, $R_4$, and $R_b$ may be the same or different.)

Formula (III) will be described.

In Formula (III), $R_3$ represents a hydrogen atom or a substituent. Examples of the substituent include examples of the substituent group Z described above.

$R_3$ is preferably a hydrogen atom or an alkyl group, more preferably a hydrogen atom, a methyl group or an ethyl group, even more preferably a hydrogen atom.

$J_2$ represents —CO—, —COO—, —CONR$_2$—, —OCO—, a methylene group, a phenylene group, or a —C$_6$H$_4$CO— group. $R_2$ represents a hydrogen atom, an alkyl group, an aryl group, or an aralkyl group and is preferably a hydrogen atom, an alkyl group, an aryl group and preferred ranges thereof are the same as preferred ranges of an alkyl group, an aryl group described in the substituent group Z. Of these, $J_1$ is preferably —CO—, —COO— or —OCO—, particularly preferably —COO—.

$W_2$ represents a single bond or represents a bivalent linking group. Examples of the bivalent linking group include a linear, branched or cyclic alkylene group (preferably an alkylene group having 1 to 30 carbon atoms, more preferably alkylene group having 1 to 12 carbon atoms, more preferably alkylene group having 1 to 4 carbon atoms, examples thereof include methylene, ethylene, propylene, butylene, pentylene, hexylene, octylene, decylene and the like), an alkyleneoxy group (preferably an alkyleneoxy group having 1 to 30 carbon atoms, more preferably alkyleneoxy group having 1 to 12 carbon atoms, more preferably alkyleneoxy group having 1 to 4 carbon atoms, and examples thereof include methyleneoxy, ethyleneoxy, propyleneoxy, butyleneoxy, pentyleneoxy, hexyleneoxy, octyleneoxy, decyleneoxy and the like), an aralkylene group (preferably an aralkylene group having 7 to 30 carbon atoms, more preferably aralkylene group having 7 to 13 carbon atoms, and examples thereof include benzylidene, cinnamylidene and the like), an arylene group (preferably an arylene group having 6 to 30 carbon atoms, more preferably arylene group having 6 to 15 carbon atoms, and examples thereof include phenylene, cumenylene, mesitylene, tolylene, xylylene and the like) and the like. These compounds may further have a substituent. The further substituent is preferably a hydroxyl group or a halogen atom, more preferably a hydroxyl group or a fluorine atom, particularly preferably a fluorine atom. In addition, it is preferable to have an ether bond in the molecule.

$W_2$ is preferably a single bond, an alkylene group or an alkyleneoxy group, more preferably a single bond.

$R_b$ represents an alkylene glycol residue or a propylene glycol residue. The molecular weight of the alkylene glycol residue or propylene glycol residue is preferably 500 to 1,000,000, more preferably 500 to 500,000, even more preferably 1,000 to 300,000.

$R_4$ represents a hydrogen atom, an alkyl group or an aryl group, preferably an alkyl group.

The polymer comprising the repeating unit represented by Formula (III) is preferably formed by polymerizing a compound represented by the following Formula (IIIa).

[Chem. 11]

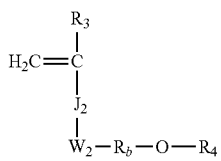

Formula (IIIa)

(In Formula (IIIa), $R_3$ represents a hydrogen atom or a substituent. $J_2$ represents —CO—, —COO—, —CONR$_2$—, —OCO—, a methylene group, a phenylene group, or a —C$_6$H$_4$CO— group. $R_2$ represents a hydrogen atom, an alkyl group, an aryl group, or an aralkyl group. $W_2$ represents a single bond or a bivalent linking group. $R_b$ represents an alkylene glycol residue or a propylene glycol residue, and $R_4$ represents a hydrogen atom, an alkyl group, or an aryl group.)

In Formula (IIIa), $R_3$, $R_4$, $R_b$, $J_2$ and $W_2$ have the same meaning as $R_3$, $R_4$, $R_b$, $J_2$ and $W_2$ of Formula (III), and the preferred ranges are also the same.

In the polymer comprising the repeating unit represented by Formula (II) and the repeating unit represented by Formula (III), the content of the repeating unit represented by Formula (II) is preferably 0.1 to 99 mol %, more preferably 0.5 to 90 mol %, particularly preferably 1 to 80 mol %, with respect to the total repeating units constituting the polymer, and the content of the repeating unit represented by Formula (III) is preferably 1 to 99.9 mol %, more preferably 10 to 99.5 mol %, particularly preferably 20 to 99 mol %, with respect to the total repeating units constituting the polymer.

The repeating unit represented by Formula (II) is preferably a repeating unit represented by the following Formula (VIII).

[Chem. 12]

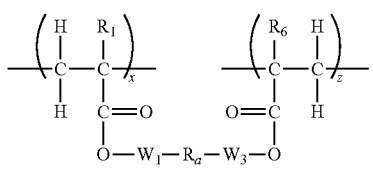

Formula (VIII)

(In Formula (VIII), $W_1$ and $W_3$ represent a single bond or a bivalent linking group. Each of $R_1$ and $R_6$ independently represent a hydrogen atom or a substituent. Ra represents an alkylene glycol residue or a propylene glycol residue. Each of x and z independently represent a positive integer of 1 or more.)

In Formula (VIII), $W_1$, $R_1$ and Ra have the same meaning as $W_1$, $R_1$ and Ra of Formula (II). $W_3$ has the same meaning as $W_1$ and the preferred range is also the same. $R_6$ has the same meaning as $R_1$ and the preferred range is also the same. Each of x and z independently represent a positive integer of 1 or more. Preferably, x is 10 to 1000, and z is 10 to 1000, more preferably, x is 50 to 1000 and z is 50 to 1000.

The polymer comprising repeating units represented by Formula (VIII) is preferably formed by polymerizing a compound represented by the following Formula (VIIIa).

[Chem. 13]

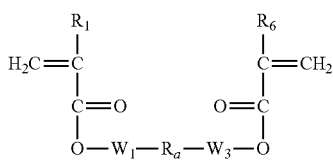

Formula (VIIIa)

(In Formula (VIIIa), $W_1$ and $W_3$ represent a single bond or a bivalent linking group. Each of $R_1$ and $R_6$ independently represent a hydrogen atom or a substituent. Ra represents an alkylene glycol residue or a propylene glycol residue.)

In Formula (VIIIa), $R_1$, $R_6$, $W_1$, $W_3$ and Ra of Formula (VIIIa) have the same meaning as $R_1$, $R_6$, $W_1$, $W_3$ and Ra of Formula (VIII), and the preferred ranges are also the same.

The repeating unit represented by Formula (III) is preferably a repeating unit represented by the following Formula (IX).

[Chem. 14]

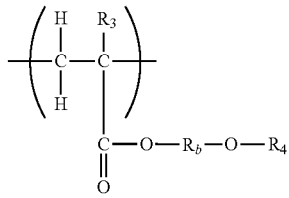

Formula (IX)

(In Formula (IX), $R_3$ represents a hydrogen atom or a substituent. $R_b$ represents an alkylene glycol residue or a propylene glycol residue, and $R_4$ represents a hydrogen atom, an alkyl group or an aryl group. Each of a plurality of $R_3$, $R_b$, and $R_4$ may be the same or different.)

In Formula (IX), $R_3$, $R_4$, and $R_b$ have the same meaning as $R_3$, $R_4$ and $R_b$ of Formula (III), and the preferred ranges are also the same.

The polymer comprising the repeating unit represented by Formula (IX) is preferably formed by polymerizing a compound represented by the following Formula (IXa).

[Chem. 15]

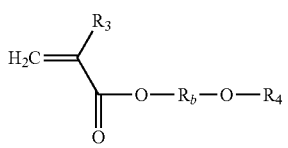

Formula (IXa)

(In Formula (IXa), $R_3$ represents a hydrogen atom or a substituent. $R_b$ represents an alkylene glycol residue or a propylene glycol residue, and $R_4$ represents a hydrogen atom, an alkyl group or an aryl group.)

In Formula (IXa), $R_3$, $R_4$, and $R_b$ have the same meaning as $R_3$, $R_4$ and $R_b$ of Formula (IX), and the preferred ranges are also same.

The polymer comprising the repeating unit represented by Formula (II), and the polymer comprising the repeating unit represented by Formula (II) and the repeating unit represented by Formula (III) can be obtained by polymerizing monomers corresponding to the respective repeating units. Specific examples of preferred monomers (exemplary monomers M-1 to M-30) are provided below and the present invention is not limited thereto. Also, in specific examples, p, q and r represent an arbitrary positive integer.

[Chem. 16]

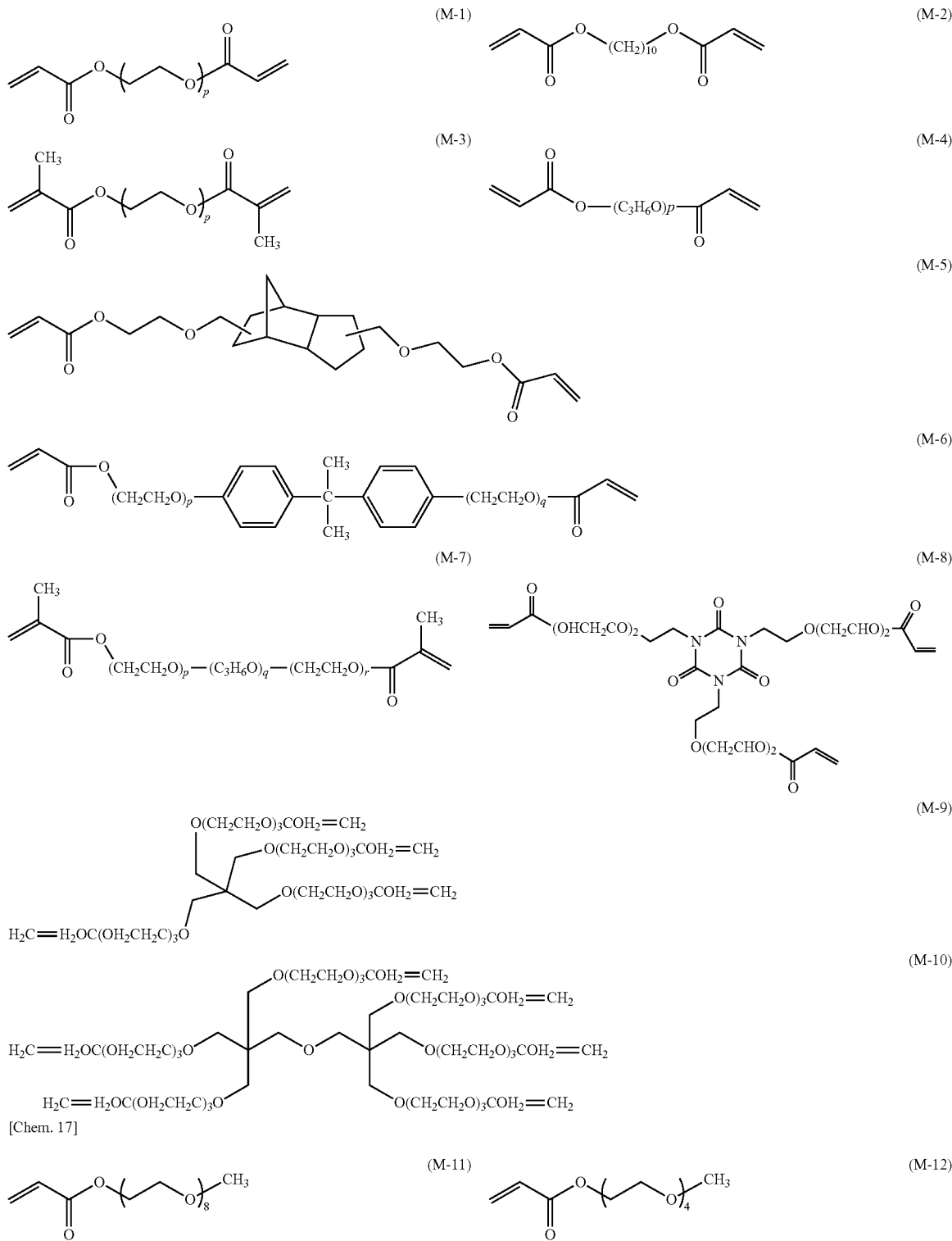

[Chem. 17]

-continued
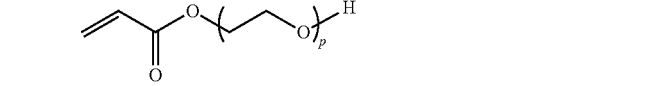
(M-13)
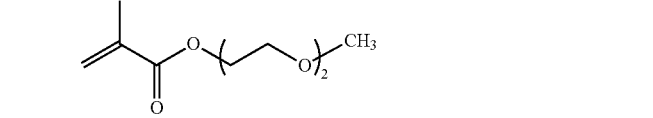
(M-14)
(M-15)
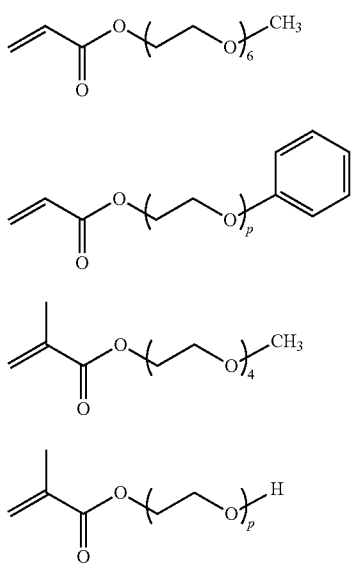
(M-16)
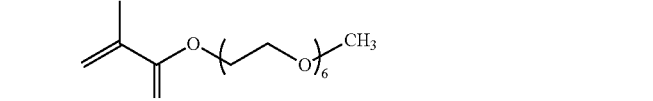
(M-17)
(M-18)
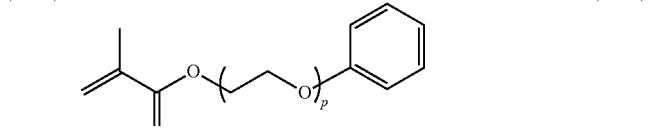
(M-19)
(M-20)
[Chem. 18]
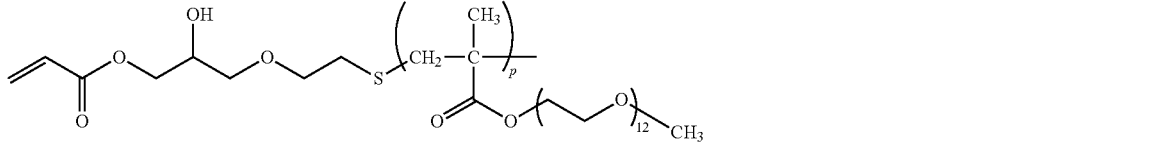
(M-21)
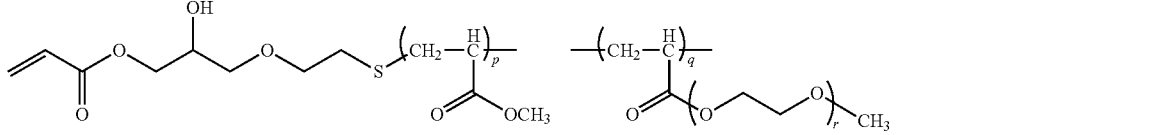
(M-22)
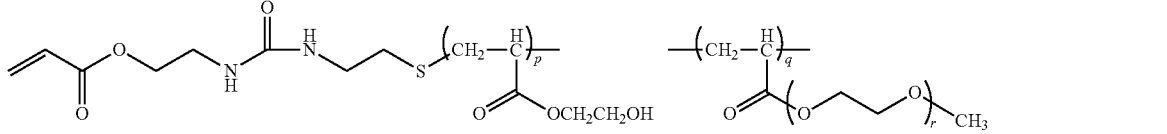
(M-23)
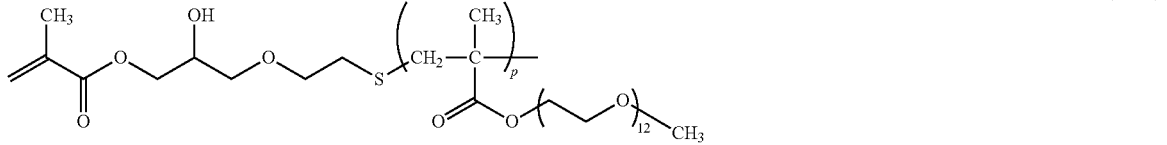
(M-24)
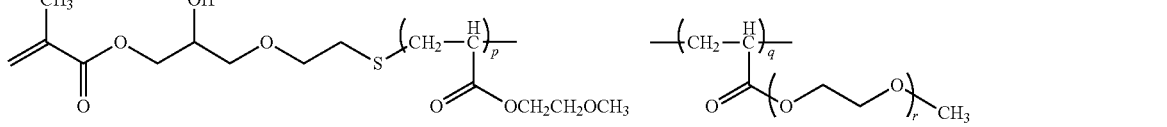
(M-25)
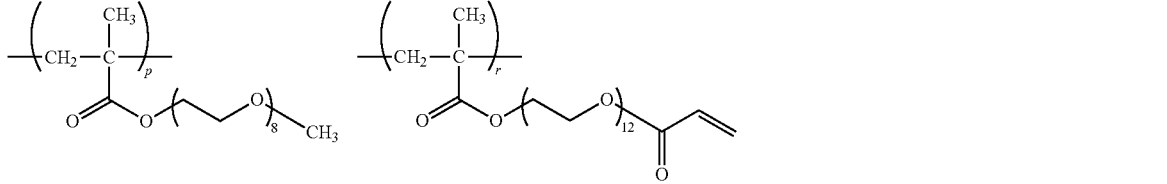
(M-26)

-continued

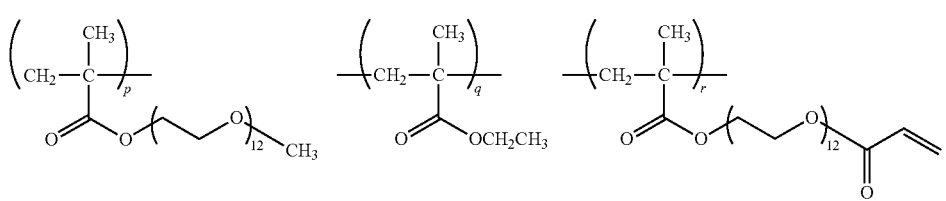
(M-27)

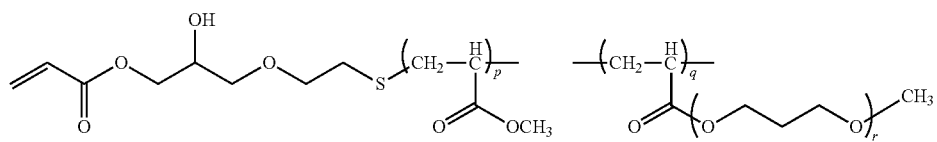
(M-28)

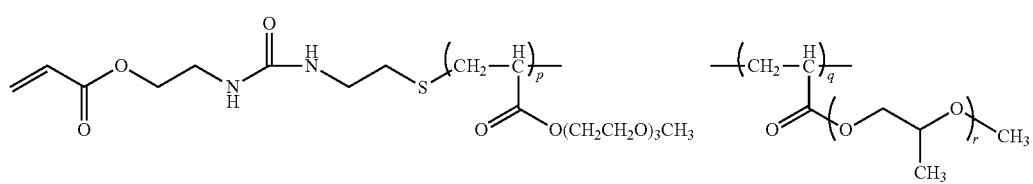
(M-49)

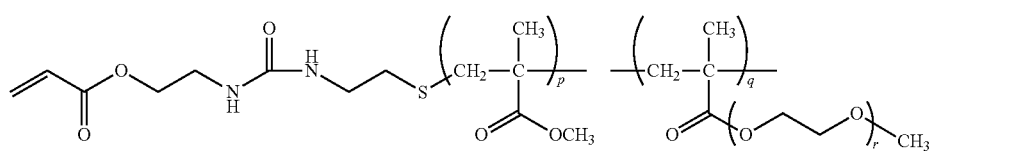
(M-30)

In the gas separation membrane of the present invention, the third layer is preferably a polymer comprising, in a main chain structure, a repeating unit selected from polyethylene glycol represented by the following Formula (IV), polypropylene glycol represented by the following Formula (V) or Formula (VI), or polydimethylsiloxane represented by the following Formula (VII).

When the partial structure represented by the following Formulae (VII) to (IX) is a main chain, the partial structure preferably accounts for 30 to 99%, more preferably 40 to 99%, even more preferably 50 to 99%, as a weight ratio with respect to the cross-linked polymer. The molecular weight of the main chain is high to the extent that membrane-forming property is imparted by entanglement of molecular chains and is preferably 500 to 1,000,000, more preferably 500 to 500,000, even more preferably 1,000 to 300,000.

[Chem. 19]

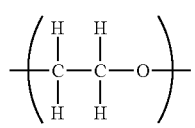
(Formula (IV))

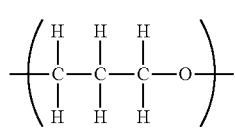
(Formula (V))

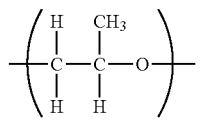
(Formula (VI))

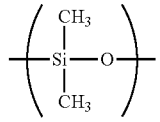
(Formula (VII))

Respective compounds to synthesize the polymer comprising the repeating unit represented by Formula (II), the polymer comprising the repeating unit represented by Formula (II) and the repeating unit represented by Formula (III), and the polymer comprising the repeating unit represented by any one of Formulae (IV) to (VII) may be commercially available or easily synthesized.

The polymer according to the present invention may be a copolymer with other monomers. Examples of useful other monomers include well-known monomers such as acrylic acid esters, methacrylic acid esters, acrylamides, methacrylamides, vinyl esters, styrenes, acrylic acid, methacrylic acid, acrylonitrile, maleic anhydride and maleic imide. By copolymerizing these monomers, physical properties such as membrane-forming property, membrane strength, hydrophilicity, hydrophobicity, solubility, reactivity and stability can be improved.

The synthesis of monomers is for example carried out with reference to ester synthesis items of "5$^{th}$ experiment science lecture 16, organic synthesis (IV)" or handling or purification items of monomers of "5$^{th}$ experiment science lecture 26, polymer chemistry" edited by the Japanese Chemical Society (issued by Maruzen Co. Ltd.).

[Method for Producing Gas Separation Membrane]

In the gas separation membrane of the present invention, as a step for forming a separation-active membrane (second layer) that substantially contributes to separation, a membrane is preferably formed by application at least on the surface of a porous support. The method of application is not particularly limited, is selected depending on the intended purpose and examples thereof include spin coating method, bar application, die coating application, blade application, air knife application, gravure coating, roll coating application, spray application, dip application, comma rolling method, kiss coating method, screen printing, inkjet printing and the like. Any solvent may be used without particular limitation so long as it is capable of dissolving a material for the separation-active membrane and examples thereof include one, or a mixture of two or more types selected from water-soluble solvents or organic solvents such as water, methanol, ethanol, isopropyl alcohol, chloroform, methylene chloride, acetone, dioxane, methyl acetate, cyclohexanone, methylethyl ketone, acetonitrile, tetrachloroethylene, tetrahydrofuran, dimethylsulfoxide, dimethylformamide, dimethylacetamide, N-methylpyrrolidone and the like. The amount of used solvent is preferably 0.1- to 50-fold by mass, more preferably 0.5- to 20-fold by mass, particularly preferably 1- to 15-fold by mass, with respect to the total solid of the composition constituting the second layer.

In the method for producing the gas separation membrane of the present invention, the third layer can be formed by casting a composition for forming the third layer comprising monomers corresponding to the repeating units represented by Formula (II) to (III) on the second layer and curing the composition through irradiating active radiation or heating. Also, the composition for forming the third layer can be cured by a combination of irradiating active radiation and heating. It is preferred that the third layer is formed by irradiating active radiation to the composition comprising the compound represented by Formulae (IIa) to (IXa), and thereby forming a polymer comprising repeating units represented by Formula (II) to (IX).

The separation-active membrane is a gas separation membrane that contains a polymerization initiator described below and is formed by curing by irradiation of active radiation. Here, the active radiation is not particularly limited so long as it produces energy capable of generating initiation species in the membrane composition when irradiated and broadly includes α-ray, γ-ray, X-rays, ultraviolet rays, visible rays, electric beams and the like. Of these, ultraviolet rays and electric beams are preferred in terms of curing sensitivity and easy availability of apparatuses, and ultraviolet rays are particularly preferred.

In the case of a thermal curing, it is preferably carried out by heating at 40° C. to 250° C., more preferably 40° C. to 200° C. The heating time is affected by used membrane material, concentration, initiator or amount of added cross-linking agent, and cannot be completely decided, is thus determined depending on temperature and time sufficient for forming membranes, and is generally preferably 10 minutes to 24 hours, more preferably 1 hour to 12 hours. The heating may be carried out using a variety of ovens, hot plates, air blowers or the like.

In addition, from a viewpoint of inactivating unreacted active points remaining in the cross-linked polymer of the second layer and the third layer and completely performing polymerization and membrane curing, after irradiation of active radiation, heating may be further performed. In this case, the heating is preferably at 40° C. to 250° C., more preferably 40° C. to 200° C. Heating time is preferably 10 minutes to 12 hours, more preferably 10 minutes to 6 hours.

In the present invention, when ultraviolet rays are used in the present invention, addition of the following photopolymerization initiator is necessary. Electric beam curing is preferred since a polymerization initiator is unnecessary and a permeation depth is large. An electric beam accelerator may utilize a scanning manner, a double scanning manner or a curtain beam manner and is preferably a curtain beam manner capable of obtaining high power at a relatively low cost. Regarding properties of electric beam, an acceleration voltage is 30 to 1000 kV, preferably 50 to 300 kV. An absorbed dose is preferably 5 to 200 kGy (0.5 to 20 Mrad), more preferably 20 to 100 kGy (2 to 10 Mrad). When the acceleration voltage and absorbed amount are within these ranges, a sufficient amount of energy is permeated and energy efficiency is thus good. Regarding the atmosphere, at which an electric beam is irradiated, an oxygen concentration is preferably 200 ppm or less under a nitrogen atmosphere. Within this range, cross-linkage and curing are well performed around the surface.

A mercury lamp is used as a light source of ultraviolet rays. The mercury lamp utilizes a lamp of 20 to 240 W/cm$^2$ and is used at a speed of 0.3 to 20 m/min. The distance between the membrane and the mercury lamp is preferably generally 1 to 30 cm. When a desktop-type ultraviolet ray curing apparatus is used, curing is preferably performed after suitably controlling light amount and position of light source according to the material and environments for about 1 second to about 10 minutes.

Well-known radiation curing apparatuses, conditions and the like described in "UV•EB curing techniques" (issued by Technical Integration Center, Corp.) or "Application techniques of low-energy electric beam irradiation" (2000, issued by CMC Co., Ltd.) and the like may be used. Curing may be used in conjunction with heating.

[Polymerization Initiator]

In the process of forming a gas separation membrane of the present invention, a radical polymerization initiator is preferably added and a photopolymerization initiator is particularly preferably added.

The photopolymerization initiator of the present invention is a compound that causes chemical reaction via action of light or interaction with a sensitizing dye in an electron-excited state and thus produces at least one of radicals, acid and base.

The photopolymerization initiator may be appropriately selected from those having a sensitivity with respect to irradiated active radiation such as ultraviolet rays of 400 to 200 nm, far ultraviolet rays, g-rays, h-rays, i-rays, KrF excimer laser beam, ArF excimer laser beam, electron beam, X-rays, molecular beam or ion beam.

Specifically, the photopolymerization initiator may be selected from those well-known to those skilled in the art without limitation and specific examples thereof include the compounds described in Bruce M. Monroe et al., Chemical Review, 93, 435 (1993), R. S, Davidson, Journal of Photochemistry and biology A: Chemistry, 73.81 (1993), J. P. Faussier, "Photonitiated Polymerization-Theory and Applications": Rapra Review Vol. 9, Report, Rapra Technology (1998), and M. Tsunooka et al., Prog. Polym. Sci., 21, 1 (1996). It is also possible to use the compounds for chemically amplified resists or photocation polymerization described in "Organic Materials for Imaging", edited by the Japanese Research Association for Organic Electronics Materials, published by Bunshin Design Printing Publishing and Digital Communications (1993), pp. 187-192. Further, compounds that cause bond cleavage in an acidic or basic manner via interaction with a sensitizing dye in an electron-excited state are also known, such as those described in F. D. Saeva, Topics in Current Chemistry, 156, 59 (1990), G. G. Maslak, Topics in Current Chemistry, 168, 1 (1993), H. B. Shuster et al., JACS, 112, 6329 (1990), and I. D. F. Eaton et al., JACS, 102, 3298 (1980).

Preferred examples of the photopolymerization initiator include (a) aromatic ketones, (b) aromatic onium salt compounds, (c) organic peroxides, (d) hexaaryl biimidazole compounds, (e) ketoxime ester compounds, (f) borate compounds, (g) azinium compounds, (h) metallocene compounds, (i) active ester compounds, and (j) compounds having a carbon-halogen bond and the like.

Examples of (a) aromatic ketone compounds include the compounds having a benzophenone skeleton or a thioxanthone skeleton described in J. P. Fouassier and J. F. Rabek, Radiation Curing in Polymer Science and Technology (1993), pp. 77-117. Preferred examples of (a) aromatic ketone compounds include α-thiobenzophenone compounds described in Examined Japanese Patent Application Publication No. 47-6416, benzoin ether compounds described in Examined Japanese Patent Application Publication No. 47-3981, α-substituted benzoin compounds described in Examined Japanese Patent Application Publication No. 47-22326, benzoin derivatives described in Examined Japanese Patent Application Publication No. 47-23664, aroyl phosphonates ester described in JP-A-57-30704, dialkoxy-benzophenones described in Examined Japanese Patent Application Publication No. 60-26483, benzoin ethers described in Examined Japanese Patent Application Publication No. 60-26403 and JP-A-62-81345, α-aminobenzophenones described in Examined Japanese Patent Application Publication No. 1-34242, U.S. Pat. No. 4,318,791 and European Patent Application Publication No. 0284561A1, p-di(dimethylaminobenzoyl)benzenes described in JP-A-2-211452, thio-substituted aromatic ketones described in JP-A-61-194062, acylphosphinesulfide described in Examined Japanese Patent Application Publication No. 2-9597, acylphosphine described in Examined Japanese Patent Application Publication No. 2-9596, thioxanthones such as Examined Japanese Patent Application Publication No. 63-61950, and coumarins described in Examined Japanese Patent Application Publication No. 59-42864.

The (b) aromatic omium salts include aromatic omium salts of elements of Groups V, VI and VII of the periodic table, and more specifically, N, P, As, Sb, Bi, O, S, Se, Te or I. Preferred examples of (b) aromatic omium salts include: iodonium salts described in the specification of European Patent No. 104143, the specification of U.S. Pat. No. 4,837,124, JP-A-2-150848 and JP-A-2-96514; sulfonium salts described in the respective specifications of European Patent No. 370693, European Patent No. 233567, European Patent No. 297443, European Patent No. 297442, European Patent No. 279210, European Patent No. 422570, U.S. Pat. No. 3,902,144, U.S. Pat. No. 4,933,377, U.S. Pat. No. 4,760,013, U.S. Pat. No. 4,734,444 and U.S. Pat. No. 2,833,827; diazonium salts (such as benzene diazonium which may contain a substituent); resins of diazonium salts (such as formaldehyde resins of diazo diphenylamine); N-alkoxy pyrridium salts (such as those described in the specification of U.S. Pat. No. 4,743,528, and the respective pamphlets of JP-A-63-138345, JP-A-63-142345, JP-A-63-142346 and JP-A-46-42363, and more specifically, 1-methoxy-4-phenyl pyrridium tetrafluoroborate); or compounds such as those described in the respective pamphlets of Examined Japanese Patent Application Publication No. 52-147277, Examined Japanese Patent Application Publication No. 52-14278 and Examined Japanese Patent Application Publication No. 52-14279. These salts produce radicals or acids as the active species.

The (c) "organic peroxides" described above include almost all organic compounds having one or more oxygen-oxygen bonds in the molecule, and preferred examples thereof include peroxide esters such as: 3,3',4,4'-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl)benzophenone, 3,3',4,4'-tetra-(t-octylperoxycarbonyl)benzophenone, 3,3',4,4'-tetra-(cumylperoxycarbonyl)benzophenone, 3,3',4,4'-tetra-(p-isopropylcumylperoxycarbonyl)benzophenone, di-t-butyl di-peroxy isophthalate, and the like.

Examples of the (d) hexaaryl biimidazoles mentioned above include lophine dimers described in Examined Japanese Patent Application Publication No. 45-37377 and Examined Japanese Patent Application Publication No. 44-86516, such as: 2,2'-bis(o-chlorophenyl)-4,4',5,5'-tetraphenyl biimidazole; 2,2'-bis(o-bromophenyl)-4,4',5,5'-tetraphenyl biimidazole; 2,2'-bis(o,p-dichloro-phenyl)-4,4',5,5'-tetraphenyl biimidazole; 2,2'-bis(o-chlorophenyl)-4,4',5,5'-tetra-(m-methoxyphenyl)biimidazole; 2,2'-bis(o,o'-dichloro-phenyl)-4,4',5,5'-tetraphenyl biimidazole; 2,2'-bis(o-nitrophenyl)-4,4',5,5'-tetraphenyl biimidazole; 2,2'-bis(o-methyl-phenyl)-4,4',5,5'-tetraphenyl biimidazole; and 2,2'-bis(o-trifluorophenyl)-4,4',5,5'-tetraphenyl biimidazole, and the like.

Examples of the (e) ketoxium esters include 3-benzoyloxy-iminobutan-2-one, 3-acetoxy-iminobutan-2-one, 3-propionyloxy-iminobutan-2-one, 2-acetoxy-iminopentan-3-one, 2-acetoxyimino-1-phenylpropan-1-one, 2-benzoyloxy-imino-1-phenylpropan-1-one, 3-p-toluene sulfonyloxy iminobutan-2-one, and 2-ethoxycarbonyl oxyimino-1-phenylpropan-1-one, and the like.

Examples of the (f) borate salts as other examples of photopolymerization initiators compounds that can be used in the present invention are the compounds described in the respective specifications of U.S. Pat. No. 3,567,453, U.S. Pat. No. 4,343,891, European Patent No. 109772 and European Patent No. 109773.

Examples of the (g) azinium compounds, as other examples of photopolymerization initiators, include compounds having N—O bonds described in the respective pamphlets of JP-A-63-138345, JP-A-63-142345, JP-A-63-142346, JP-A-63-143537 and Examined Japanese Patent Application Publication No. 46-42363.

Examples of the (h) metallocene compounds, as other examples of photopolymerization initiators, include titanocene compounds as described in the respective pamphlets of JP-A-59-152396, JP-A-61-151197, JP-A-63-41484, JP-A-2-249, and JP-A-2-4705, and iron-arene complexes described in the respective pamphlets of JP-A-1-304453 and JP-A-1-152109.

Specific examples of the aforementioned titanocene compound include: di-cyclopentadienyl-Ti-di-chloride; di-cyclopentadienyl-Ti-bis-phenyl; di-cyclopentadienyl-Ti-bis-2,3,4,5,6-pentafluorophen-1-yl; di-cyclopentadienyl-Ti-bis-2,3,5,6-tetrafluorophen-1-yl; di-cyclopentadienyl-Ti-bis-2,4,6-trifluorophen-1-yl; di-cyclopentadienyl-Ti-bis-2,6-difluorophen-1-yl; di-cyclopentadienyl-Ti-bis-2,4-difluorophen-1-yl; di-methyl-cyclopentadienyl-Ti-bis-2,3,4,5,6-pentafluorophen-1-yl; di-methyl-cyclopentadienyl-Ti-bis-2,3,5,6-tetrafluorophen-1-yl; di-methyl-cyclopentadienyl-Ti-bis-2,4-difluorophen-1-yl; bis(cyclopentadienyl)-bis(2,6-difluoro-3-(pyr-1-yl)phenyl)titanium; bis(cyclopentadienyl) bis[2,6-difluoro-3-(methyl-sulfonamide)phenyl]titanium; and bis(cyclopentadienyl)bis[2,6-difluoro-3-(N-butyl biaroyl-amino)phenyl]titanium, and the like.

Examples of the (i) active ester compounds include nitrobenzyl ester compounds described in the respective specifications of European Patent No. 0290750, European Patent No. 046083, European Patent No. 156153, European Patent No. 271851 and European Patent No. 0388343, the respective specifications of U.S. Pat. No. 3,901,710 and U.S. Pat. No. 4,181,531, and the respective pamphlets of JP-A-60-198538, and JP-A-53-133022; iminosulfonate compounds described in the respective specifications of European Patent No. 0199672, European Patent No. 84515, European Patent No. 199672, European Patent No. 044115, and European Patent No. 0101122, the respective specifications of U.S. Pat. No. 4,618,564, U.S. Pat. No. 4,371,605, and U.S. Pat. No. 4,431,774, and the respective pamphlets of JP-A-64-18143, JP-A-2-245756, and JP-A-4-365048; and compounds described in the respective pamphlets of JP-A-62-6223, JP-A-63-14340 and JP-A-59-174831.

Preferred examples of the (j) compounds containing an oxygen halogen bond include:

a compound as described by Wakabayashi, et al., in Bull. Chem. Soc. Japan, 42, 2924 (1969), a compound described in the specification of GB Patent No. 1388492, a compound described in the pamphlet of JP-A-53-133428, a compound as described in the specification of German Patent No. 3337024, and the like.

Other examples include a compound described by F. C. Schaefer, et. al., in J. Org. Chem., 29, 1527 (1964), a compound described in the pamphlet of JP-A-62-58241, a compound described in the pamphlet of JP-A-5-281728, and the like. Other examples include a compound described in the specification of German Patent No. 2641100, a compound described in the specification of German Patent No. 3333450, a group of compounds described in the specification of German Patent No. 3021590, a group of compounds described in the specification of German Patent 3021599 and the like.

The amount of used polymerization initiator is preferably 0.01% by mass to 10% by mass, more preferably 0.1% by mass to 5% by mass, based on the amount of the polymerizable compound.

[Cosensitizer]

A known compound having a function of further improving sensitivity, or suppressing polymerization inhibition due to oxygen, and the like, may be added as a cosensitizer in the process of producing the gas separation membrane.

Examples of the cosensitizer include amines such as the compounds described in M. R. Sander et al., Journal of Polymer Society, Vol. 10, p. 3173 (1972), the pamphlet of Examined Japanese Patent Application Publication No. 44-20189, the pamphlet of JP-A-51-82102, the pamphlet of JP-A-52-134692, the pamphlet of JP-A-59-138205, the pamphlet of JP-A-60-84305, the pamphlet of JP-A-62-18537, the pamphlet of JP-A-64-33104 and Research Disclosure Vol. 33825. Specific examples include triethanolamine, p-dimethylaminobenzoic acid ethyl ester, p-formyldimethylaniline and p-methylthiodimethylaniline.

Other cosensitizers include thiols and sulfides, such as thiol compounds described in the respective pamphlets of JP-A-53-702, Examined Japanese Patent Application Publication No. 55-500806 and JP-A-5-142772 and disulfide compounds described in the pamphlet of JP-A-56-75643. Specific examples include 2-mercaptobenzothiazole, 2-mercaptobenzoxazole, 2-mercaptobenzimidazole, 2-mercapto-4(3H)-quinazoline, β-mercaptonaphthalene and the like Other examples of cosensitizers include amino acid compounds (such as N-phenylglycine), organic metal compounds (such as tributyltin acetate) described in the pamphlet of Examined Japanese Patent Application Publication No. 48-42965, hydrogen donors described in the pamphlet of Examined Japanese Patent Application Publication No. 55-34414, sulfur compounds (such as trithian) described in the pamphlet of JP-A-6-308727, phosphorous compounds (such as diethyl phosphite) described in the pamphlet of JP-A-6-250387, Si—H, Ge—H compounds described in the pamphlet of Japanese Patent Application No. 6-191605 and the like.

[Physical Properties]

The gas separation membrane of the present invention preferably has a glass transition temperature of lower than 50° C. from a viewpoint of accomplishing a flexible membrane property with a large gas diffusion coefficient, in order to impart bendability and reverse separation selectivity of acid gas (specifically, carbon dioxide)/hydrogen.

A variety of polymer compounds may be added to the gas separation membrane of the present invention, in order to adjust the membrane property of the present invention. Examples of polymer compounds include acryl-based polymers, polyurethane resins, polyamide resins, polyester resins, epoxy resins, phenol resins, polycarbonate resins, polyvinyl butyral resins, polyvinyl formal resins, shelac, vinyl-based resins, acryl-based resins, rubber-based resins, waxes, and other natural resins. These resins may be used alone or in combination of two or more kinds thereof.

(Tensile Modulus)

A tensile modulus is expressed by a ratio of tensile strength per unit area and elongation generated in a strength direction and it can be seen that when strain to tensile modulus is plotted on a graph, variation in strain, that is, gradient of the straight line part of the graph, is tensile modulus, and as the value becomes smaller, bendability increases and is advantageous to plasticity.

The tensile modulus of the gas separation membrane of the present invention is preferably 500 MPa or more, more preferably 600 MPa or more, even more preferably 700 MPa or more. The upper limit is preferably 1000 MPa, more preferably 900 MPa.

(Tensile Strength)

Tensile strength means a maximum stress at which a material can endure during tension, and the gas separation membrane of the present invention preferably has a tensile strength of 15 N/mm$^2$ or more, and a fracture elongation of 10% or more, more preferably has a tensile strength of 15 to 500 N/mm$^2$ and a fracture elongation of 10 to 100%, even more preferably, has a tensile strength of 15 to 100 N/mm$^2$, and a fracture elongation of 10 to 50%. As fracture elongation becomes higher, bendability increases, thereby it is preferable.

(Heat Resistance)

The gas separation membrane of the present invention preferably has a heat resistance of 100° C. or higher, more preferably heat resistance of 150° C. or higher, from a viewpoint in which the separation membrane can be used at a temperature as high as possible and cost of separation energy is thus reduced. Specifically, separation selectivity of $CO_2/H_2$ is preferably 100 or more under high temperature conditions of 100° C. or higher.

(Gas Separation Selectivity)

In the present invention, gas separation selectivity of a first gas and a second gas means a value obtained through division of gas permeability of the first gas and gas permeability of the second gas at a certain temperature, which can be obtained by the following equation. As the value of separation selectivity becomes larger, separation selectivity of gas separation membrane becomes superior.

Separation selectivity of first gas/second gas=(first gas permeability)/(second gas permeability)

In the present invention, separation selectivity of $CO_2$ and $H_2$ at 25° C. obtained in accordance with the following equation is preferably 100 or more, more preferably 200 or more. The separation selectivity of $CO_2$ and $H_2$ at 100° C. is preferably 100 or more, more preferably 150 or more. As the upper limit becomes larger, separation performance of the membrane is superior and the upper limit is not particularly limited, but can be 5,000, preferably 1,000 or less as a guide at both 25° C. and 100° C. It is preferred that through balance with gas permeability, suitable separation selectivity is exerted.

Separation selectivity of $CO_2/H_2$=($CO_2$ gas permeability)/($H_2$ gas permeability)

[Plasticizer]

The gas separation membrane may comprise a plasticizer from a viewpoint of imparting bendability.

Examples of the plasticizer include dioctyl phthalate, didodecyl phthalate, triethylene glycol dicaprylate, methyl glycol phthalate, tricresyl phosphate, dioctyl adipate, dibutyl sebacate, triacetyl glycerin and the like. Moreover, as the plasticizer, polyethylene glycols, polypropylene glycol (mono-ol type or diol type), polypropylene glycol (mono-ol type or diol type) and ion liquids (for example, tetraammonium salts, imidazolium salts, phosphonium salts and the like) can be exemplified.

The plasticizer has a function of making membranes flexible and should have good compatibility with the polymer constituting the second layer and/or the third layer. In general, a compound having high hydrophilicity has good compatibility with the polymer. Of compounds having high hydrophilicity, a compound having a structure alternately containing a hydrophilic group and a hydrophobic group, for example, an ether compound containing a hetero atom in a straight chain or a secondary amine is preferably used. This is because the existence of hydrophilic group, such as —O— or —NH—, expresses compatibility with PVA and a derivative thereof and the hydrophobic group other than the hydrophilic group weakens the intermolecular force of PVA and a derivative thereof to act for increase in the flexibility.

Also, a compound having a small number of hydroxy groups capable of forming a hydrogen bond between polyvinyl alcohol and derivatives thereof is preferably used as the plasticizer. Examples of such compound include ethylene glycol, propylene glycol and a dimer, a trimer, a homomultimer or a comultimer including tetramer or more thereof and a secondary amine, for example, diethanolamine or dimethylolamine. Among them, ethylene glycols (including monomer, dimer, trimer and multimer) which have small steric hindrance, are excellent in compatibility and have lower toxicity are particularly preferably used as the plasticizer.

Ethylene glycols are roughly divided into three classes depending on the molecular weight thereof. The first class includes ethylene glycol which is a monomer. The second class includes diethylene glycol which is a dimer and triethylene glycol which is a trimer. The third class includes polyethylene glycol including a tetramer or more. The polyethylene glycols are broadly classified into liquid polyethylene glycols having a molecular weight of 200 to 700 and solid polyethylene glycols having a molecular weight of 1,000 or more. The polyethylene glycols which are often marketed under trade names indicating the average molecular weight thereof in the suffix position may be used.

As the plasticizer has a lower molecular weight, it has the larger effect of rendering the resin flexible. For this reason, particularly, ethylene glycol in the first class, diethylene glycol and triethylene glycol in the second group and tetraethylene glycol (tetramer) included in the third class are preferably used. Among them, diethylene glycol, triethylene glycol and tetraethylene glycol are more preferably used as the plasticizer from a viewpoint of lower toxicity and excellent handling property because of free from extraction from the resin composition. Mixtures of two or more thereof are also preferably used.

[Surfactant]

In addition, a nonionic surfactant, a cationic surfactant, an organic fluoro surfactant or the like may be added in order to adjust liquid physical properties.

Specific examples of the surfactant include anionic surfactants such as alkylbenzene sulfonate, alkyl naphthalene sulfonate, higher fatty acid salts, sulfonate of higher fatty acid ester, ester sulfate of higher alcohol ether, sulfonates of higher alcohol ether, alkylcarboxylates of higher alkylsulfone amide and alkylphosphates, nonionic surfactants such as polyoxyethylene alkyl ether, polyoxyethylene alkyl phenyl ether, polyoxyethylene fatty acid ester, sorbitan fatty acid ester, ethylene oxide adducts of acetylene glycol, ethylene oxide adducts of glycerin, polyoxyethylene sorbitan fatty acid ester and the like. Other examples include amphoteric surfactants such as alkyl betaine or amide betaine, silicone-based surfactants, fluorine-based surfactants and the like. The surfactant may be suitably selected from conventionally known surfactants and derivatives thereof.

[Polymer Dispersant]

Specific examples of polymer dispersants include polyvinyl pyrrolidone, polyvinyl alcohol, polyvinyl methylether, polyethylene oxide, polyethylene glycol, polypropylene glycol, polyacryl amide and the like. Among them, polyvinyl pyrrolidone is preferably used.

As monomers corresponding to a repeating unit represented by Formulae (I) to (III), oligomers or prepolymers may be used. The polymers to obtain polymer compounds may be any one of block copolymers, random copolymers, graft copolymers or the like. Block copolymers or graft copolymers are particularly preferred in terms of viscosity and compatibility.

Membrane thickness of the first layer (porous membrane), the second layer that is the separation selection layer, and the third layer is not particularly limited, but the second layer and the third layer are preferably as thin as possible, in so far as permeability and separation selectivity are exhibited, when taking into consideration gas permeability.

The total membrane thickness of the second layer and the third layer is preferably 0.01 to 50%, more preferably 0.01 to 10%, even more preferably 0.1 to 1%, with respect to the membrane thickness of the first layer.

The membrane thickness ratio of the second layer and the third layer is not particularly limited. Since a main function of the second layer is separation property, and a main function of the third layer is surface protection and pinhole inhibition, the third layer is preferably thinner than the second layer and is as thin as possible, the third layer has a membrane thickness of preferably of about ½ of, more preferably about ⅓ of, and even more preferably about ⅕, of membrane thickness of the second layer.

In the third layer, as the composition ratio of repeating units having a plurality of cross-linkage structures shown in Formula (II) or Formula (III) increases, the effect of molecular structure is great, but strength of membrane and separation selectivity are roughly improved, permeability of gas is deteriorated. For this reason, the repeating unit is preferably used based on a composition ratio of 1 to 50% by mass, preferably 5 to 30% by mass as a guide and the composition ratio is not limited to this range. By changing the composition ratio according to the purpose of gas separation (recovery ratio, purity or the like), gas permeability and separation selectivity are adjusted. In addition, the dense layer that substantially contributes to separation of the gas separation membrane of the present invention is the second layer. When the third layer is used alone, it does not deny that separation selectivity is exhibited.

Conditions for forming the gas separation membrane of the present invention are not particularly limited, the temperature is preferably −30 to 100° C., more preferably −10 to 80° C., particularly preferably 5 to 50° C.

In the present invention, gas such as air or oxygen may be present during formation of membrane, but the formation is preferably performed under an inert gas atmosphere.

In addition, water or an organic solvent may be added as a medium used for production of the gas separation membrane. Specifically, organic solvents to be used are not particularly limited, but hydrocarbon-based organic solvents such as n-hexane and n-heptane; ester-based organic solvents such as methyl acetate, ethyl acetate, butyl acetate; lower alcohols such as methanol, ethanol, n-propanol, isopropanol, n-butanol, isobutanol and tert-butanol; aliphatic ketones such as acetone, methyl ethyl ketone, methyl isobutyl ketone and diacetone alcohol; ether-based organic solvents such as ethylene glycol, diethylene glycol, triethylene glycol, glycerin, propylene glycol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, dibutyl butyl ether and tetrahydrofuran; N-methylpyrrolidone, 2-pyrrolidone, dimethylformamide, dimethyl imidazolidinone, dimethyl sulfoxide, dimethyl acetamide and the like. These compounds may be used alone or in combination of two or more types.

In the gas separation membrane of the present invention, the separation-active layer (second layer) preferably has a membrane thickness of 0.01 to 200 μm, more preferably 0.1 to 150 μm, even more preferably 0.1 to 130 μm. The membrane thickness of third layer having a higher gas permeability than the second layer is preferably 0.005 to 100 μm, more preferably 0.05 to 60 μm, even more preferably 0.1 to 30 μm.

[Composite Membrane]

In the gas separation membrane of the present invention, a second layer that is a separation-active layer is preferably formed at least on the surface of the first layer that is a porous membrane. The formation is more preferably carried out by applying or immersing a composition for forming the separation-active layer at least on the surface of the first layer and irradiating active radiation thereto.

The separation-active layer (second layer) may be formed on the surface and the inner surface of the porous membrane (first layer) and is formed at least one surface thereof to form a composite membrane. By forming a separation-active layer (second layer) at least on the surface of the porous membrane (first layer), a composite membrane having advantages of high separation selectivity and high gas permeability, superior mechanical strength can be obtained. Regarding the membrane thickness of the separation-active layer, the separation-active layer is preferably as thin as possible, in a condition for imparting high gas permeability while maintaining mechanical strength and separation selectivity.

Figure 2:
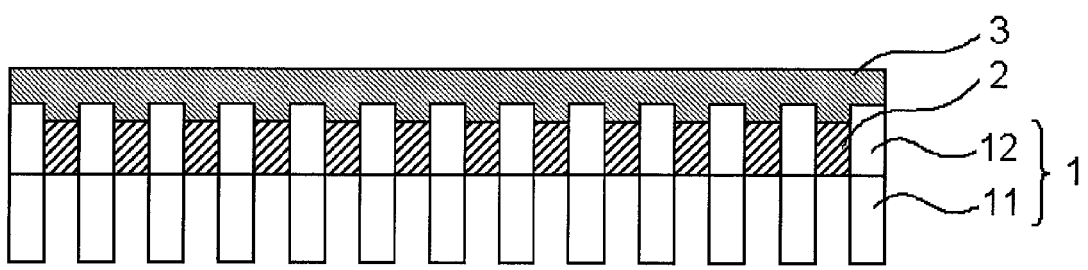
FIG. 2 is a view schematically illustrating a gas separation membrane according to another embodiment of the present invention.

In FIGS. 1 and 2, one embodiment in which the gas separation membrane of the present invention is a composite membrane is illustrated. The gas separation membrane illustrated in FIGS. 1 and 2 includes a first layer 1 that is porous, a second layer 2 that is a separation-active layer, and a third layer 3 in this order. The first layer 1 is a laminate of a hydrophobic porous layer 11 and a hydrophilic porous layer 12, and the second layer 2 is partially permeated into the hydrophilic porous layer 12 and forms a composite membrane with the first layer. Also, when clear boundary between the third layer 3 and the second layer 2 is not formed, or permeability of the third layer 3 is considerable, according to compatibility of the third layer 3 and the second layer 2, the membrane may have a configuration shown in FIG. 2.

[Configuration of Preferred Range]

The configuration of preferred range of the gas separation membrane of the present invention will be described. The gas separation membrane of the present invention is preferably a gas separation membrane that comprises a separation-active layer having a membrane thickness of 0.01 to 200 μm made of a copolymer comprising organic amine, alkali metal carbonate, alkali metal bicarbonate or alkali metal phosphate, having a molecular weight of 100 to 100,000 and at least one repeating unit represented by Formula (I), and a layer having a membrane thickness of 0.005 to 100 μm made of a cross-linked polymer comprising at least one repeating unit selected from polyethylene glycol, polypropylene glycol, polysiloxane and polyolefin, formed at least on the surface of the separation-active layer, more preferably, a gas separation membrane that comprises a separation-active layer having a membrane thickness of 0.01 to 150 μm made of a copolymer comprising organic amine, alkali metal carbonate, alkali metal bicarbonate or alkali metal phosphate, having a molecular weight of 100 to 5,000 and at least one repeating unit represented by Formula (I), and a layer having a membrane thickness of 0.05 to 60 μm made of a cross-linked polymer comprising at least one repeating unit selected from polyethylene glycol, polypropylene glycol and polysiloxane, formed at least on the surface of the separation-active layer, even more preferably, a gas separation membrane that comprises a separation-active layer having a membrane thickness of 0.01 to 130 μm made of a copolymer comprising organic amine or alkali metal phosphate having a molecular weight of 100 to 3,000 and at least one repeating unit represented by Formula (I), and a layer having a membrane thickness of 0.1 to 30 μm made of a cross-linked polymer comprising at least one repeating unit represented by Formula (II) and at least one repeating unit represented by Formula (III), formed at least on the surface of the separation-active layer.

[Method for Separating a Gas Mixture]

According to the method for separating a gas mixture of the present invention, the gas separation membrane of the present invention is used for a method for separating at least one acid gas from a mixed gas containing the at least one acid gas and at least one non-acid gas by the gas separation membrane.

Examples of the acid gas include carbon dioxide, hydrogen sulfide, carbonyl sulfide, sulfur oxide (SOx) and nitrogen oxide (NOx) and examples of the non-acid gas include hydrogen, methane, nitrogen and carbon monoxide.

The acid gas is preferably carbon dioxide or hydrogen sulfide.

In the method for separating gas using the gas separation membrane of the present invention, the ingredients of gas mixture of raw materials are not particularly restricted, but main ingredients of the gas mixture are preferably carbon dioxide and methane or carbon dioxide and hydrogen. When the gas mixture is present together with an acid gas such as carbon dioxide or hydrogen sulfide, the membrane exerts considerably superior performance, preferably exerts superior performance in separation of carbon dioxide and hydrocarbon such as methane, carbon dioxide and nitrogen, or carbon dioxide and hydrogen.

[Gas Separation Membrane Module·Gas Separation Apparatus]

The gas separation membrane of the present invention may be provided as a gas separation membrane module. Also, an apparatus having a means for separating and recovering or separating and purifying gas may be provided using the gas separation membrane or the gas separation membrane module of the present invention.

The gas separation membrane of the present invention is preferably used in the form of a module. Examples of the module include spiral, hollow, pleat, tubular, plate and frame types and the like. Also, the polymer membrane of the present invention may be applied to an apparatus for separating and recovering gas as a membrane/absorption hybrid method in conjunction with an absorption solution, for example, as described in JP-A-2007-297605.

The gas separation membrane of the present invention having superior properties described above is preferably used for a gas separation recovery method or a gas separation purification method.

EXAMPLES

Hereinafter, the present invention will be described in more detail with reference to examples, but the present invention is not limited to these examples. In addition, "part" and "%" is based on mass, unless otherwise particularly described.

Example 1

20 g of water was added to 1 g of a polyvinyl alcohol (hereinafter referred to as PVA)/polyacrylic acid (hereinafter referred to as PAA) copolymer (produced by Sumitomo Seika Chemicals Co., Ltd., water-permeable resin SS gel), followed by stirring at room temperature to dissolve the gel. Then, 0.136 g of glutaraldehyde (25% aqueous solution) was added thereto, followed by stirring at a temperature of 95° C. for 15 hours. Also, 2.33 g of cesium carbonate (acid gas carrier) was further added thereto, followed by further stirring at room temperature to obtain a casting solution (I). A hydrophobic PVDF membrane (produced by Millipore Corp., hydrophobic Durapore, pore diameter: 0.22 μm, diameter of membrane: 47 mm) was placed on an even and clean glass plate with a size of 10 cm×10 cm and further hydrophilic PVDF (produced by Millipore Corp., hydrophilic Durapore pore diameter: 0.1 μm, diameter of membrane: 47 mm) was stacked thereon, followed by allowing to stand (first layer), and the casting solution (I) was casted and applied using an applicator and dried in air for one night to form a PVA/PAA gel membrane (second layer: separation-active layer) (membrane thickness of first layer: 240 μm, membrane thickness of second layer: 120 μm).

Then, 2.8 g of polyethylene glycol methyl ether methacylate (produced by Wako Pure Chemical Industries Ltd., M-18) and 1.2 g of polyethylene glycol dimethacylate (produced by Sigma-Aldrich Co., Ltd., product number: 43, 746-8, Mn=875, M-3) were mixed in a 30 ml brown vial bottle and stirred for 30 minutes, 0.04 g of 1-hydroxycyclohexyl phenyl ketone (produced by Sigma-Aldrich Co., Ltd., product number: 40, 561-2) was further added thereto, and the resulting mixture was further stirred for 30 minutes to obtain a casting solution (II). (viscosity: 130 mPa·s, solid concentration: 99% by mass)

A laminate of the PVDF (first layer) and the PVA/PAA gel membrane (second layer) that had been dried in air for one night was softly placed, the casting solution (II) was casted on the PVA/PAA gel membrane, further, the extra casting solution was removed using a cast knife, the membrane was exposed to light at 60 mW for 60 seconds using a UV irradiator (EXECURE 3000; manufactured by HOYA CORPORATION) to form a third layer. Then, the membrane was detached from the glass plate and further heated at 120° C. for 2 hours. The membrane thickness of obtained membrane was measured with an electric micrometer (produced by Anritsu Corporation, K-402B). (membrane thickness of first layer: 240 μm, membrane thickness of second layer: 120 μm, membrane thickness of third layer: 5 μm)

Example 2

A gas separation membrane was produced in the same manner as in Example 1, except that 0.25 g of 2,3-diaminopropionic acid-hydrochloride salt was used as an acid gas carrier, instead of cesium carbonate, and cesium hydroxide was changed to 0.54 g (2 equivalents to 3,3-diaminopropionic acid). (membrane thickness of first layer: 250 μm, membrane thickness of second layer: 140 μm, membrane thickness of third layer: 15 μm)

Example 3

A gas separation membrane was produced in the same manner as in Example 1, except that 0.5 g of PAMAM dendrimer (produced by Sigma-Aldrich Co., Ltd., product number: 412368, molecular weight: 516.68, organic amine) was used as an acid gas carrier, instead of cesium carbonate. (membrane thickness of first layer: 250 μm, membrane thickness of second layer: 140 μm, membrane thickness of third layer: 22 μm)

Example 4

A gas separation membrane was produced in the same manner as in Example 1, except that 2.8 g of polyethylene glycol methyl ether methacylate (M-18) and 1.2 g of polyethylene glycol dimethacylate (M-3) were changed into 2.0 g of a monomer (M-15) and 2.0 g of a monomer (M-6), respectively. ((viscosity of casting solution (II): 250 mPa·s, solid concentration: 99% by mass) (membrane thickness of first layer: 250 μm, membrane thickness of second layer: 130 μm, membrane thickness of third layer: 13 μm)

Example 5

A gas separation membrane was produced in the same manner as in Example 1, except that 2.8 g of polyethylene methyl ether methacylate (M-18) and 1.2 g of polyethylene glycol dimethacylate (M-3) were changed into 4.0 g of a monomer (M-27). (membrane thickness of first layer: 250 μm, membrane thickness of second layer: 125 μm, membrane thickness of third layer: 10 μm)

Example 6

A gas separation membrane was produced in the same manner as in Example 1, except that the PVA/PAA copolymer was changed into PVA (Mw=88,000, produced by Kanto Chemical Co., Inc.) (membrane thickness of first layer: 240

μm, membrane thickness of second layer: 130 μm, membrane thickness of third layer: 8 μm)

Example 7

5.8 g of α-dimethylvinylsilyl-ω-dimethylvinylsiloxy-polydimethylsiloxane, DMS-V41 (trade name) produced by Gelest, Inc. and 6.3 g of α-hydrodimethylsilyl-ω-hydrodimethylsiloxy-polydimethylsiloxane, DMS-H41 (trade name) produced by Gelest, Inc. were mixed with 50 g of toluene, 14 mg of PT-VTSC-3.0X (trade name) produced by Umicore Precious metals was added thereto as a platinum catalyst, followed by heating under nitrogen atmosphere at 80° C. for 4 hours. The molecular weight of obtained polymer was Mp=180,000. This polymer was dissolved in toluene to obtain 1% mass of a solution (viscosity: 350 mPa·s). A gas separation membrane was produced using this dimethylsiloxane solution instead of casting solution (II) of Example 1. (membrane thickness of first layer: 240 μm, membrane thickness of second layer: 120 μm, membrane thickness of third layer: 5 μm)

Example 8

A gas separation membrane having a total thickness of 305 μm (membrane thickness of first layer: 250 μm, membrane thickness of second layer: 125 μm, membrane thickness of third layer: 55 μm) was produced in the same manner as in Example 1, except that the casting solution (II) was repeatedly applied five or more times.

Example 9

A gas separation membrane having a total thickness of 375 μm (membrane thickness of first layer: 250 μm, membrane thickness of second layer: 120 μm, membrane thickness of third layer: 5 μm) was produced in the same manner as Example 1, except that the process of exposing 0.04 g of 1-hydroxycyclohexyl phenyl ketone (produced by Sigma-Aldrich Co., Ltd., product number: 40, 561-2) as the casting solution (II) at 60 mW for 60 seconds to 0.04 g of 2,2'-azoisobutyronitrile (produced by Wako Pure Chemical Industries Ltd., product number: 019-04932) was changed into heating under a nitrogen atmosphere at 80° C. for 3 hours.

Comparative Example 1

With reference to JP-A-2009-195000, water was added to 1 g of a PVA/PAA copolymer (produced by Sumitomo Seika Chemicals Co., Ltd., water-permeable resin SS gel), followed by stirring at room temperature to dissolve the gel. Then, 2.33 g of cesium carbonate and 0.136 g of glutaraldehyde (25% aqueous solution) were weighed in a 30 ml vial bottle, and 20 g of water was added thereto, followed by stirring for one day to dissolve the substances to obtain a casting solution. Then, the casting solution was centrifuged to remove foams (at a rotation speed of 5000 rpm for 30 minutes), this casting solution was casted using an applicator on the surface of a hydrophilic PVDF porous membrane side of a laminated porous membrane in which two pieces of hydrophilic PVDF porous membrane (produced by Millipore Corp., hydrophilic Durapore VVLP, pore diameter: 0.1 μm, diameter of membrane: 47 mm) and the hydrophobic PVDF porous membrane (produced by Millipore Corp., hydrophobic Durapore GVHP, membrane thickness: 125 μm, pore diameter: 0.22 μm) were stacked, and the hydrophilic PVDF porous membrane after casting was dried in air for half a day. The air-dried PTFE porous membrane was further cross-linked at about 120° C. for about 2 hours, to obtain a gas separation membrane. (membrane thickness of first layer: 240 μm, membrane thickness of second layer: 120 μm)

Comparative Example 2

With reference to JP-A-2008-36463, specifically, 1 g of the PVA/PAA copolymer (for example, produced by Sumitomo Seika Chemicals Co., Ltd., tentatively named "SS gel"), 0.25 g of 2,3-diaminepropionic acid monohydrochloride salt, 0.54 g of cesium hydroxide (2 equivalents of 2,3-diaminopropionic acid), and 0.2 g of an additive (ion liquid such as AEB) were weighed in a 30 ml brown vial bottle, 20 g of water was added thereto, followed by stirring for one day to dissolve the substances, to obtain a casting solution. A gas separation membrane was produced in the same manner as in Comparative Example 1, except that an additive was added to the casting solution. (membrane thickness of first layer: 245 μm, membrane thickness of second layer: 130 μm)

Comparative Example 3

With reference to WO 2006/50531, 13.15 g of PVA (Mw=88,000, produced by Kanto Chemical Co., Inc.) and 88.54 g of water were added to a 200 ml eggplant flask, followed by heating with stirring at 80° C. to completely dissolve the substance. 3.19 g of 37% HCHO, an aqueous potassium hydroxide solution (potassium hydroxide: 2.01 g, water: 8.72 g), 7.38 g of polyethyleneimine, 44.9 g of water, and, additionally, 2.77 g of N,N-dimethylglycin, and 9.1 g of lithium hydroxide were slowly added thereto, followed by stirring at 80-85° C. for 30 minutes. A gas separation membrane was produced in the same manner as in Comparative Example 1, except that this casting solution was used. (membrane thickness of first layer: 240 μm, membrane thickness of second layer: 120 μm)

Comparative Example 4

A gas separation membrane having a total membrane thickness of 300 μm (membrane thickness of first layer: 250 μm, membrane thickness of second layer: 175 μm) was produced in the same manner as in Comparative Example 1, except that the casting solution (I) of the Comparative Example 1 was repeatedly applied five or more times on the hydrophilic PVDF porous membrane.

($H_2$ Gas Permeability, $CO_2$ Gas Permeability)

Gas permeability of hydrogen ($H_2$) and carbon dioxide ($CO_2$) was measured at a relative humidity of 90% at 25° C. and at a relative humidity of 90% at 100° C. by a gas permeability measuring apparatus (produced by GTR TEC Corporation, GTR-10XF), using a mix gas of $CO_2/H_2$=5/95.

(Separation Selectivity of $CO_2/H_2$)

Gas permeability of hydrogen ($H_2$)/carbon dioxide ($CO_2$) was measured at a relative humidity of 90% at room temperature (25° C.) and at a relative humidity of 90% at 100° C. by a gas permeability measuring apparatus (produced by GTR TEC Corporation, GTR-10×F), using a mix gas of $CO_2/H_2$=5/95 and the separation selectivity was obtained by division of the value of the permeability (in accordance with the following equation)

$$\text{Separation selectivity of } CO_2/H_2 = (CO_2 \text{ gas permeability})/(H_2 \text{ gas permeability})$$

(Gas Permeability Ratio of Third Layer/Second Layer)

In order to compare gas permeability between the cross-linked polymer membrane that forms the second layer and the cross-linked polymer membrane that forms the third layer, the casting solution (I) and the casting solution (II) excluding the acid gas carrier were uniformly casted on hydrophilicity PVDF (produced by Millipore Corp., hydrophilicity Durapore pore diameter: 0.1 μm, diameter of membrane: 47 mm) respectively and were dried and irradiated by light in the same manner as Example 1 respectively to produce a cured membrane. (membrane thickness: 120 μm) Gas permeability of carbon dioxide ($CO_2$) was measured in the same manner as above (at relative humidity of 90% at 25° C.), to obtain a ratio of gas permeability of the third layer and gas permeability of the second layer.

(Sample Error Ratio)

50 samples of each of the gas separation membranes described in Examples 1 to 9 and Comparative Examples 1 to 4 were produced, permeability of hydrogen of each sample was measured, the sample having a gas permeance higher than $1 \times 10^6$ ml/$m^2 \cdot 24$ h·atm was defined as a membrane having pinholes, and a value obtained by dividing the number of the membrane having pinholes by the number of the produced samples was calculated as a sample error ratio.

Regarding the gas separation membranes described in Examples 1 to 9 and Comparative Examples 1 to 4, the results of total membrane thickness, $CO_2$ gas permeance (25° C., 100° C.), $CO_2/H_2$ separation selectivity (25° C., 100° C.), third layer/second layer gas permeance ratio, and sample error ratio are shown in Table 1 below.

The gas separation membrane of the present invention is capable of providing a method for producing a superior gas separation membrane that exhibits superior $CO_2/H_2$ separation selectivity at room temperature (25° C.) and high temperature (100° C.) and has little pinholes. Also, it can be seen that the gas separation membrane of the present invention exhibits superior gas permeability although it has a membrane thickness comparable to Comparative Example (Comparison between Example 8 and Comparative Example 4).

(Bending Test)

When the gas separation membrane thus obtained was subjected to operation including bending 180 degrees and restoring 50 cycles at room temperature under a dry condition, the shape of the membrane was evaluated by the naked eye based on three grades of splitting and crack states.

A: splitting and crack were not generated on the membrane at all.

B: 2 pieces or less of splitting and crack were generated on the membrane.

C: 5 pieces or less of splitting and crack were generated on the membrane.

D: 50% or more of splitting and crack were generated.

(Pressure Resistance Test)

The composite membranes obtained in Examples and Comparative Examples were cut in the form of a circle with a diameter of 47 mm, inserted into a cell, pressurized with an autoclave as shown in Table 3, the membrane was separated from the cell, and splitting and crack states were evaluated by

TABLE 1

| | Total membrane thickness (μm) | $CO_2$ gas permeance ($m^3/m^2 \cdot s \cdot Pa$) (25° C.) | $H_2$ gas permeance ($m^3/m^2 \cdot s \cdot Pa$) (25° C.) | $CO_2$ gas permeance ($m^3/m^2 \cdot s \cdot Pa$) (100° C.) | $H_2$ gas permeance ($m^3/m^2 \cdot s \cdot Pa$) (100° C.) | $CO_2/H_2$ separation selectivity 25° C. | $CO_2/H_2$ separation selectivity 100° C. | Third layer/second layer gas permeance ratio | Sample error ratio (of 50 samples) |
|---|---|---|---|---|---|---|---|---|---|
| Example 1 (the present invention) | 365 | $7.1 \times 10^{-10}$ | $2.2 \times 10^{-12}$ | $5.5 \times 10^{-10}$ | $2.3 \times 10^{-12}$ | 323 | 239 | 19 | 6% |
| Example 2 (the present invention) | 405 | $5.3 \times 10^{-10}$ | $1.9 \times 10^{-12}$ | $4.2 \times 10^{-10}$ | $1.9 \times 10^{-12}$ | 279 | 221 | 13 | 4% |
| Example 3 (the present invention) | 412 | $6.9 \times 10^{-10}$ | $2.1 \times 10^{-12}$ | $5.0 \times 10^{-10}$ | $2.1 \times 10^{-12}$ | 329 | 238 | 15 | 6% |
| Example 4 (the present invention) | 393 | $4.5 \times 10^{-10}$ | $1.7 \times 10^{-12}$ | $3.2 \times 10^{-10}$ | $1.7 \times 10^{-12}$ | 265 | 188 | 17 | 2% |
| Example 5 (the present invention) | 385 | $8.1 \times 10^{-11}$ | $3.4 \times 10^{-12}$ | $5.7 \times 10^{-11}$ | $3.4 \times 10^{-13}$ | 238 | 168 | 20 | 6% |
| Example 6 (the present invention) | 378 | $1.9 \times 10^{-10}$ | $8.0 \times 10^{-13}$ | $1.3 \times 10^{-10}$ | $8.3 \times 10^{-13}$ | 238 | 157 | 15 | 4% |
| Example 7 (the present invention) | 365 | $1.5 \times 10^{-10}$ | $4.2 \times 10^{-13}$ | $9.8 \times 10^{-11}$ | $4.3 \times 10^{-13}$ | 357 | 228 | 105 | 2% |
| Example 8 (the present invention) | 430 | $6.8 \times 10^{-11}$ | $2.0 \times 10^{-13}$ | $3.9 \times 10^{-11}$ | $2.0 \times 10^{-13}$ | 340 | 195 | 11 | 6% |
| Example 9 (the present invention) | 375 | $5.8 \times 10^{-11}$ | $2.4 \times 10^{-12}$ | $4.1 \times 10^{-10}$ | $2.3 \times 10^{-12}$ | 241 | 178 | 15 | 8% |
| Comparative Example 1 | 360 | $2.1 \times 10^{-10}$ | $1.5 \times 10^{-12}$ | $1.1 \times 10^{-10}$ | $1.5 \times 10^{-12}$ | 140 | 73 | — | 54% |
| Comparative Example 2 | 375 | $3.5 \times 10^{-10}$ | $2.5 \times 10^{-12}$ | $2.0 \times 10^{-10}$ | $2.4 \times 10^{-13}$ | 140 | 83 | — | 44% |
| Comparative Example 3 | 360 | $6.3 \times 10^{-11}$ | $4.6 \times 10^{-13}$ | $4.1 \times 10^{-11}$ | $4.6 \times 10^{-13}$ | 137 | 89 | — | 26% |
| Comparative Example 4 | 425 | $4.4 \times 10^{-12}$ | $3.9 \times 10^{-14}$ | $3.2 \times 10^{-12}$ | $3.9 \times 10^{-14}$ | 113 | 82 | — | 20% | the naked eye based on four grades to perform a pressure resistance test. The results thus obtained are shown in Table 2 below, together with bending test results.

A: splitting and crack were not generated on the membrane at all.

B: 2 pieces or less of splitting and crack were generated on the membrane.

C: 5 pieces or less of splitting and crack were generated on the membrane.

D: 50% or more of splitting and crack were generated.

TABLE 2

|  | Repeated bending test | Pressure resistance test (450 kPa) | (1 MPa) |
|---|---|---|---|
| Example 1 (the present invention) | B | B | C |
| Example 2 (the present invention) | A | B | B |
| Example 3 (the present invention) | A | A | B |
| Example 4 (the present invention) | B | B | B |
| Example 5 (the present invention) | B | B | C |
| Example 6 (the present invention) | B | B | C |
| Example 7 (the present invention) | A | A | A |
| Example 8 (the present invention) | B | B | B |
| Example 9 (the present invention) | B | B | C |
| Comparative Example 1 | D | B | D |
| Comparative Example 2 | D | B | D |
| Comparative Example 3 | D | D | D |
| Comparative Example 4 | D | D | D |

The gas separation membrane of the present invention has plasticity and pressure resistance to the extent that it can endure bending test and pressurization conditions.

(Measurement of Tensile Modulus)

A sample fragment with a size of 1.0 cm×5.0 cm was cut from each sample and was allowed to stand at 25° C. and a relative humidity of 60% overnight, and tensile modulus thereof was measured at a tension speed of 3 mm/min using Tensilon (produced by Toyo. Baldwin Co., Ltd., Tensilon RTM-25). (distance between chucks: 3 cm). The measurement was performed on three samples and an average of the measured values was obtained as a tensile modulus.

(Measurement of Tensile Strength)

A value obtained by dividing the fracture strength of each sample, when tension was applied thereto at a distance between chucks of 25 mm and at a speed of 50 mm/min, by a cross-sectional area prior to application of tension was defined as a tensile strength.

(Measurement of Fracture Elongation)

The fracture elongation was defined as a value obtained by dividing displacement until fracture occurred during tensile test by an initial distance between chucks and was expressed as percentage.

TABLE 3

|  | Tensile modulus (MPa) | Tensile strength (N/mm$^2$) | Fracture elongation (%) |
|---|---|---|---|
| Example 1 (the present invention) | 740 | 16.3 | 13.5 |
| Example 2 (the present invention) | 600 | 16.5 | 14.4 |
| Example 3 (the present invention) | 530 | 18.9 | 13.3 |
| Example 4 (the present invention) | 660 | 17.1 | 12.4 |
| Example 5 (the present invention) | 530 | 197 | 14.1 |
| Example 6 (the present invention) | 510 | 15.1 | 21.3 |
| Example 7 (the present invention) | 515 | 23.3 | 34.1 |
| Example 8 (the present invention) | 504 | 21.3 | 42.3 |
| Example 9 (the present invention) | 690 | 16.2 | 14.2 |
| Comparative Example 1 | 300 | 13.1 | 5.3 |
| Comparative Example 2 | 270 | 14.3 | 8.9 |
| Comparative Example 3 | X | X | X |
| Comparative Example 4 | 375 | 11.0 | 4.3 |

In Table 3, "X" means that as efficient data could not be obtained since the membrane was broken in a test early stage.

From these results, it could be seen that the gas separation membrane of the present invention had superior bending test results and a variety of tensile modulus, tensile strength, fracture elongation of 10% or more and bendability, thus exhibiting flexibility, mechanical strength and compressive strength, and, from results of pressure resistance test, it could be seen that the gas separation membrane had sufficient durability even under pressure conditions.

From these results, the gas separation membrane of the present invention could provide a method for producing a separation membrane that exhibited superior carbon dioxide/hydrogen separation selectivity and plasticity, to the extent that endures the bending test, and had little pinholes. Also, the gas separation membrane of the present invention exhibited superior mechanical strength. Through the gas separation membrane of the present invention, it is possible to provide a superior gas separation method, a gas separation membrane module, and a gas separation and purification apparatus including the gas separation membrane module.

INDUSTRIAL APPLICABILITY

The present invention provides an excellent gas separation membrane that exhibits superior gas separation selectivity such as $CO_2/H_2$ separation selectivity and superior mechanical strength due to plasticity, to the extent that endures a bending test and has little pinholes. Through the gas separation membrane of the present invention, it is possible to provide a superior gas separation method, a gas separation membrane module, and a gas separation apparatus including the gas separation membrane module.

Although the present invention has been described in detail with reference to specific embodiments, it will be apparent to those skilled in the art that various variations and modifications are possible within the spirit and scope of the present invention.

This application claims the benefit of Japanese Patent Application No. 2010-028268, filed on Feb. 10, 2010 which is herein incorporated by reference as if fully set forth herein.

DESCRIPTION OF REFERENCE NUMERALS

1 First layer
2 Second layer (separation-active layer)
3 Third layer
11 Hydrophobic porous layer
12 Hydrophilic porous layer

The invention claimed is:

1. A gas separation membrane to separate at least one acid gas from a mix gas, comprising in this order:
   a first layer that is porous;
   a second layer that is a separation-active layer containing a compound having a molecular weight of 150,000 or less and capable of interacting with the acid gas; and
   a third layer having high gas permeability,
   wherein the second layer comprises at least one hydrophilic cross-linked polymer and the hydrophilic cross-linked polymer comprises at least one repeating unit selected from polyethylene glycol, polypropylene glycol, polyvinyl alcohol, polyvinyl acetate, polyvinylpyrrolidone, polyethyleneimine and polyallylamine,
   the third layer comprises a cross-linked polymer and the cross-linked polymer comprises at least one repeating unit selected from polyethylene glycol, polypropylene glycol, polysiloxane, and polyolefin; and
   wherein the compound having a molecular weight of 150,000 or less and being capable of interacting with an acid gas is at least one acid gas carrier selected from hydroxide of alkali metal, alkoxide of alkali metal, alkali metal carbonate, alkali metal bicarbonate, alkali metal phosphate, hydroxide of alkaline earth metal, alkoxide of alkaline earth metal, alkaline earth metal carbonate, alkaline earth metal bicarbonate, alkali metal phosphate, organic amine, ion liquids and metal complexes.

2. The gas separation membrane according to claim 1, wherein the cross-linked polymer of the third layer comprises a repeating unit represented by the following Formula (II):

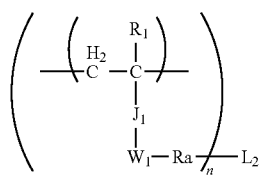

Formula (II)

wherein in Formula (II), $R_1$ each independently represents a hydrogen atom or a substituent, $L_2$ represents an n-valent linking group, n represents a positive integer of 2 or more, $J_1$ represents —CO—, —COO—, —CONR$_2$—, —OCO—, a methylene group, a phenylene group, or a —C$_6$H$_4$CO— group, wherein $R_2$ represents a hydrogen atom, an alkyl group, an aryl group, or an aralkyl group, $W_1$ represents a single bond or a bivalent linking group, Ra represents an alkylene glycol residue or a propylene glycol residue, and each of a plurality of $R_1$, $J_1$, $W_1$, and Ra may be the same or different.

3. The gas separation membrane according to claim 2, wherein the cross-linked polymer of the third layer is a polymer comprising at least one repeating unit represented by the following Formula (III) and at least one repeating unit represented by Formula (II) above:

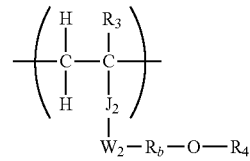

Formula (III)

wherein in Formula (III), $R_3$ represents a hydrogen atom or a substituent, $J_2$ represents —CO—, —COO—, —CONR$_2$—, —OCO—, a methylene group, a phenylene group, or a —C$_6$H$_4$CO— group, $R_2$ represents a hydrogen atom, an alkyl group, an aryl group, or an aralkyl group, $W_2$ represents a single bond or a bivalent linking group, $R_b$ represents an alkylene glycol residue or a propylene glycol residue, $R_4$ represents a hydrogen atom, an alkyl group, or an aryl group, and each of a plurality of $J_2$, $W_2$, $R_2$, $R_3$, $R_4$, and $R_b$ may be the same or different.

4. The gas separation membrane according to claim 1, wherein the cross-linked polymer of the third layer is a polymer comprising at least one repeating unit selected from the following Formula (IV), the following Formula (V), the following Formula (VI) and the following Formula (VII):

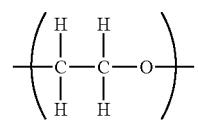

(Formula (IV))

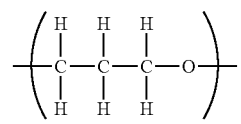

(Formula (V))

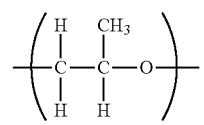

(Formula (VI))

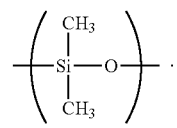

(Formula (VII))

5. The gas separation membrane according to claim 1, wherein the gas separation membrane has a tensile strength of 15 N/mm$^2$ or more and a fracture elongation of 10% or more.

6. The gas separation membrane according to claim 1, wherein the gas separation membrane has a heat resistance of 100° C. or more.

7. A method for producing the gas separation membrane according to claim 1, comprising:
   forming the third layer by irradiating an active radiation to a composition comprising a monomer of the cross-linked polymer, or heat-curing the composition comprising a monomer of the cross-linked polymer.

8. The method for producing the gas separation membrane according to claim 7,
wherein the composition comprising a monomer of the cross-linked polymer is a carrier solution having a solid concentration of 10 to 99% by mass and a viscosity of 50 to 5000 mPa·s,
wherein the gas separation membrane is formed by casting the carrier solution on the second layer and curing the carrier solution using active radiation or heating.

9. A gas separation membrane module comprising:
the gas separation membrane according to claim 1.

10. A gas separation apparatus comprising:
at least one of the gas separation membrane module according to claim 9.

11. A gas separation membrane to separate at least one acid gas from a mix gas, comprising in this order:
a first layer that is porous;
a second layer that is a separation-active layer containing a compound having a molecular weight of 150,000 or less and capable of interacting with the acid gas; and
a third layer having high gas permeability,
wherein the second layer comprises at least one hydrophilic cross-linked polymer and the hydrophilic cross-linked polymer comprises at least one repeating unit selected from polyethylene glycol, polypropylene glycol, polyvinyl alcohol, polyvinyl acetate, polyvinylpyrrolidone, polyethyleneimine and polyallylamine,
the third layer comprises a cross-linked polymer and the cross-linked polymer comprises at least one repeating unit selected from polyethylene glycol, polypropylene glycol, polysiloxane, and polyolefin, and
wherein the hydrophilic cross-linked polymer of the second layer is a polymer comprising a repeating unit represented by the following Formula (I):

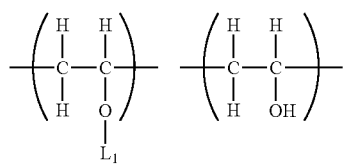

Formula (I)

wherein in Formula (I), $L_1$ represents an x-valent linking group, and x is an integer of 2 or more.

12. A gas separation membrane to separate at least one acid gas from a mix gas, comprising in this order:
a first layer that is porous;
a second layer that is a separation-active layer containing a compound having a molecular weight of 150,000 or less and capable of interacting with the acid gas; and
a third layer having high gas permeability,
wherein the second layer comprises at least one hydrophilic cross-linked polymer and the hydrophilic cross-linked polymer comprises at least one repeating unit selected from polyethylene glycol, polypropylene glycol, polyvinyl alcohol, polyvinyl acetate, polyvinylpyrrolidone, polyethyleneimine and polyallylamine,
the third layer comprises a cross-linked polymer and the cross-linked polymer comprises at least one repeating unit selected from polyethylene glycol, polypropylene glycol, polysiloxane, and polyolefin, and
wherein the gas separation membrane has a tensile modulus of 500 MPa or more.

13. A method for separating a gas mixture,
wherein the method separates at least one acid gas from a gas mixture comprising the at least one acid gas and at least one non-acid gas using a gas separation membrane to separate at least one acid gas from a mix gas, wherein the gas separation membrane comprises in this order:
a first layer that is porous;
a second layer that is a separation-active layer containing a compound having a molecular weight of 150,000 or less and capable of interacting with the acid gas; and
a third layer having high gas permeability,
wherein the second layer comprises at least one hydrophilic cross-linked polymer and the hydrophilic cross-linked polymer comprises at least one repeating unit selected from polyethylene glycol, polypropylene glycol, polyvinyl alcohol, polyvinyl acetate, polyvinylpyrrolidone, polyethyleneimine and polyallylamine,
the third layer comprises a cross-linked polymer and the cross-linked polymer comprises at least one repeating unit selected from polyethylene glycol, polypropylene glycol, polysiloxane, and polyolefin,
wherein the acid gas is at least one selected from carbon dioxide, hydrogen sulfide, carbonyl sulfide, sulfur oxide (SOx), and nitrogen oxide (NOx), and
the non-acid gas is at least one selected from hydrogen, methane, nitrogen, and carbon monoxide.

14. The method for separating a gas mixture according to claim 13,
wherein the acid gas is carbon dioxide or hydrogen sulfide.

15. The method for separating a gas mixture according to claim 13,
wherein the gas mixture comprises carbon dioxide and methane, or carbon dioxide and hydrogen.

* * * * *